United States Patent
Suzuki et al.

(10) Patent No.: US 10,998,996 B2
(45) Date of Patent: May 4, 2021

(54) TERMINAL APPARATUS, COMMUNICATION METHOD, AND INTEGRATED CIRCUIT

(71) Applicant: SHARP KABUSHIKI KAISHA, Sakai (JP)

(72) Inventors: Shoichi Suzuki, Sakai (JP); Tatsushi Aiba, Sakai (JP); Hiroki Takahashi, Sakai (JP); Shohei Yamada, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/068,267

(22) PCT Filed: Jan. 5, 2017

(86) PCT No.: PCT/JP2017/000093
§ 371 (c)(1),
(2) Date: Jul. 5, 2018

(87) PCT Pub. No.: WO2017/119429
PCT Pub. Date: Jul. 13, 2017

(65) Prior Publication Data
US 2019/0020436 A1 Jan. 17, 2019

(30) Foreign Application Priority Data
Jan. 7, 2016 (JP) .............................. JP2016-001557

(51) Int. Cl.
*H04W 4/00* (2018.01)
*H04J 11/00* (2006.01)
(Continued)

(52) U.S. Cl.
CPC ....... *H04J 11/0079* (2013.01); *H04J 11/0069* (2013.01); *H04W 48/16* (2013.01); *H04W 92/10* (2013.01)

(58) Field of Classification Search
USPC ........ 370/229, 230, 236, 252, 328, 329, 330
See application file for complete search history.

(56) References Cited

U.S. PATENT DOCUMENTS

2010/0227569 A1* 9/2010 Bala ...................... H04W 48/12
455/73
2012/0176885 A1* 7/2012 Lee ...................... H04J 13/0048
370/209
(Continued)

FOREIGN PATENT DOCUMENTS

EP 2074724 A2 7/2009
WO 2008/042575 A2 4/2008

OTHER PUBLICATIONS

3rd Generation Partnership Project; Technical Specification Group Radio Access Network; Evolved Universal Terrestrial Radio Access (E-UTRA); Physical channels and modulation, (Release 12), 3GPP TS 36.211 V12.7.0 (Sep. 2015), Sep. 25, 2015.
3rd Generation Partnership Project; Technical Specification Group Radio Access Network; Evolved Universal Terrestrial Radio Access (E-UTRA); Multiplexing and channel coding; (Release 12); 3GPP TS 36.212 V12.6.0 (Sep. 2015), Sep. 25, 2015.
(Continued)

*Primary Examiner* — Nguyen H Ngo
(74) *Attorney, Agent, or Firm* — ScienBiziP, P.C.

(57) ABSTRACT

A terminal apparatus and a base station apparatus can efficiently communicate with each other through downlink. A terminal apparatus is configured to: acquire synchronization with a cell through cell search; and receive system information associated at least with (i) an operation of NB-IoT and (ii) a raster offset. The raster offset is an offset of downlink carrier frequency from a channel raster of prescribed spacing. The downlink carrier frequency is a carrier frequency of the NB-IoT.

4 Claims, 22 Drawing Sheets

(51) Int. Cl.
*H04W 48/16* (2009.01)
*H04W 92/10* (2009.01)

(56) References Cited

U.S. PATENT DOCUMENTS

| | | | |
|---|---|---|---|
| 2013/0242974 A1* | 9/2013 | Li | H04W 56/00 370/350 |
| 2014/0198747 A1* | 7/2014 | Ouchi | H04L 5/0053 370/329 |
| 2015/0124909 A1* | 5/2015 | Sahara | H04B 7/0842 375/340 |
| 2015/0304878 A1* | 10/2015 | Wang | H04L 5/0053 370/252 |
| 2016/0316374 A1* | 10/2016 | Xu | H04W 16/14 |
| 2016/0374080 A1* | 12/2016 | Wei | H04L 5/0064 |
| 2017/0163368 A1* | 6/2017 | Kwon | H04J 13/0059 |
| 2018/0213468 A1* | 7/2018 | Chatterjee | H04W 48/10 |
| 2019/0021081 A1* | 1/2019 | Ljung | H04L 5/0044 |
| 2019/0260554 A1* | 8/2019 | Yoon | H04B 7/06 |

OTHER PUBLICATIONS

3rd Generation Partnership Project; Technical Specification Group Radio Access Network; Evolved Universal Terrestrial Radio Access (E-UTRA); Physical layer procedures; (Release 12); 3GPP TS 36.213 V12.7.0 (Sep. 2015), Sep. 25, 2015.

Status Report to TSG: NarrowBand IOT, RP-151931, Vodafone,Huawei, Ericsson,Qualcomm, 3GPP TSG RAN Meeting #70, Sitges, Spain, Dec. 7-10, 2015.

Huawei et al., Analysis of Channel Raster Impact on NB-IoT [online], 3GPP TSG-RAN WG1#83 R1-156924, Nov. 7, 2015 [retrieval date Mar. 10, 2017],Internet<URL:http://www.3gpp.org/ftp/tsg_ran/WG1_RL1/TSGR1_83/Docs/R1-156924.zip>.

Huawei et al., Proposals for NB-IoT synchronization signal design [online], 3GPPTSG-RAN WG1#83 R1-157749, Nov. 22, 2015 [retrieval date Mar. 10, 2017],Internet<URL:http://www.3gpp.org/ftp/tsg_ran/WG1_RL1/TSGR1_83/Docs/R1-157749.zip>.

Huawei et al., "Proposals for NB-IoT Downlink Design", R1-157657, 3GPP TSG-RAN WG1#83, Anaheim, USA, Nov. 15-22, 2015.

\* cited by examiner

|  | CHANNEL BANDWIDTH [MHz] | TRANSMISSION BANDWIDTH (EXPRESSED BY NUMBER OF PRBS) |
|---|---|---|
| NB-IoT | 0.2 MHz | 1 PRB |
| LTE | 1.4 MHz | 6 PRB |
|  | 3 MHz | 15 PRB |
|  | 5 MHz | 25 PRB |
|  | 10 MHz | 50 PRB |
|  | 15 MHz | 75 PRB |
|  | 20 MHz | 100 PRB ($N^{max,DL}_{RB}$) |

FIG. 4

| PHYSICAL RESOURCE BLOCK INDEX $n_{PRB}$ OF LTE CELL TO WHICH TRANSMISSION BAND OF NB-IoT CELL CORRESPONDS | | $(f_{NB\text{-}IoT} - f_{LTE})$ [kHz] | $(f_{raster} - f_{NB\text{-}IoT})$ [kHz] |
|---|---|---|---|
| CHANNEL BANDWIDTH 20 MHz | CHANNEL BANDWIDTH 10 MHz | | |
| 0 | - | -8917.5 | -17.5 |
| 1 | - | -8737.5 | -37.5 |
| 2 | - | -8557.5 | 42.5 |
| 3 | - | -8377.5 | 22.5 |
| 4 | - | -8197.5 | 2.5 |
| 5 | - | -8017.5 | -17.5 |
| 6 | - | -7837.5 | -37.5 |
| 7 | - | -7657.5 | 42.5 |
| 8 | - | -7477.5 | 22.5 |
| 9 | - | -7297.5 | 2.5 |
| 10 | - | -7117.5 | -17.5 |
| 11 | - | -6937.5 | -37.5 |
| 12 | - | -6757.5 | 42.5 |
| 13 | - | -6577.5 | 22.5 |
| 14 | - | -6397.5 | 2.5 |
| 15 | - | -6217.5 | -17.5 |
| 16 | - | -6037.5 | -37.5 |
| 17 | - | -5857.5 | 42.5 |
| 18 | - | -5677.5 | 22.5 |
| 19 | - | -5497.5 | 2.5 |
| 20 | - | -5317.5 | -17.5 |
| 21 | - | -5137.5 | -37.5 |
| 22 | - | -4957.5 | 42.5 |
| 23 | - | -4777.5 | 22.5 |
| 24 | - | -4597.5 | 2.5 |
| 25 | 0 | -4417.5 | -17.5 |
| 26 | 1 | -4237.5 | -37.5 |
| 27 | 2 | -4057.5 | 42.5 |
| 28 | 3 | -3877.5 | 22.5 |
| 29 | 4 | -3697.5 | 2.5 |

FIG. 11

| PHYSICAL RESOURCE BLOCK INDEX $n_{PRB}$ OF LTE CELL TO WHICH TRANSMISSION BAND OF NB-IoT CELL CORRESPONDS | | $(f_{NB\text{-}IoT} - f_{LTE})$ [kHz] | $(f_{raster} - f_{NB\text{-}IoT})$ [kHz] |
|---|---|---|---|
| CHANNEL BANDWIDTH 20 MHz | CHANNEL BANDWIDTH 10 MHz | | |
| 30 | 5 | -3517.5 | -17.5 |
| 31 | 6 | -3337.5 | -37.5 |
| 32 | 7 | -3157.5 | 42.5 |
| 33 | 8 | -2977.5 | 22.5 |
| 34 | 9 | -2797.5 | 2.5 |
| 35 | 10 | -2617.5 | -17.5 |
| 36 | 11 | -2437.5 | -37.5 |
| 37 | 12 | -2257.5 | 42.5 |
| 38 | 13 | -2077.5 | 22.5 |
| 39 | 14 | -1897.5 | 2.5 |
| 40 | 15 | -1717.5 | -17.5 |
| 41 | 16 | -1537.5 | -37.5 |
| 42 | 17 | -1357.5 | 42.5 |
| 43 | 18 | -1177.5 | 22.5 |
| 44 | 19 | -997.5 | 2.5 |
| 45 | 20 | -817.5 | -17.5 |
| 46 | 21 | -637.5 | -37.5 |
| 47 | 22 | -457.5 | 42.5 |
| 48 | 23 | -277.5 | 22.5 |
| 49 | 24 | -97.5 | 2.5 |
| 50 | 25 | 97.5 | -2.5 |
| 51 | 26 | 277.5 | -22.5 |
| 52 | 27 | 457.5 | -42.5 |
| 53 | 28 | 637.5 | 37.5 |
| 54 | 29 | 817.5 | 17.5 |
| 55 | 30 | 997.5 | -2.5 |
| 56 | 31 | 1177.5 | -22.5 |
| 57 | 32 | 1357.5 | -42.5 |
| 58 | 33 | 1537.5 | 37.5 |
| 59 | 34 | 1717.5 | 17.5 |

FIG. 12

| PHYSICAL RESOURCE BLOCK INDEX $n_{PRB}$ OF LTE CELL TO WHICH TRANSMISSION BAND OF NB-IoT CELL CORRESPONDS | | $(f_{NB\text{-}IoT} - f_{LTE})$ [kHz] | $(f_{raster} - f_{NB\text{-}IoT})$ [kHz] |
|---|---|---|---|
| CHANNEL BANDWIDTH 20 MHz | CHANNEL BANDWIDTH 10 MHz | | |
| 60 | 35 | 1897.5 | -2.5 |
| 61 | 36 | 2077.5 | -22.5 |
| 62 | 37 | 2257.5 | -42.5 |
| 63 | 38 | 2437.5 | 37.5 |
| 64 | 39 | 2617.5 | 17.5 |
| 65 | 40 | 2797.5 | -2.5 |
| 66 | 41 | 2977.5 | -22.5 |
| 67 | 42 | 3157.5 | -42.5 |
| 68 | 43 | 3337.5 | 37.5 |
| 69 | 44 | 3517.5 | 17.5 |
| 70 | 45 | 3697.5 | -2.5 |
| 71 | 46 | 3877.5 | -22.5 |
| 72 | 47 | 4057.5 | -42.5 |
| 73 | 48 | 4237.5 | 37.5 |
| 74 | 49 | 4417.5 | 17.5 |
| 75 | - | 4597.5 | -2.5 |
| 76 | - | 4777.5 | -22.5 |
| 77 | - | 4957.5 | -42.5 |
| 78 | - | 5137.5 | 37.5 |
| 79 | - | 5317.5 | 17.5 |
| 80 | - | 5497.5 | -2.5 |
| 81 | - | 5677.5 | -22.5 |
| 82 | - | 5857.5 | -42.5 |
| 83 | - | 6037.5 | 37.5 |
| 84 | - | 6217.5 | 17.5 |
| 85 | - | 6397.5 | -2.5 |
| 86 | - | 6577.5 | -22.5 |
| 87 | - | 6757.5 | -42.5 |
| 88 | - | 6937.5 | 37.5 |
| 89 | - | 7117.5 | 17.5 |

FIG. 13

| PHYSICAL RESOURCE BLOCK INDEX $n_{PRB}$ OF LTE CELL TO WHICH TRANSMISSION BAND OF NB-IoT CELL CORRESPONDS | | $(f_{NB\text{-}IoT} - f_{LTE})$ [kHz] | $(f_{raster} - f_{NB\text{-}IoT})$ [kHz] |
|---|---|---|---|
| CHANNEL BANDWIDTH 20 MHz | CHANNEL BANDWIDTH 10 MHz | | |
| 90 | - | 7297.5 | -2.5 |
| 91 | - | 7477.5 | -22.5 |
| 92 | - | 7657.5 | -42.5 |
| 93 | - | 7837.5 | 37.5 |
| 94 | - | 8017.5 | 17.5 |
| 95 | - | 8197.5 | -2.5 |
| 96 | - | 8377.5 | -22.5 |
| 97 | - | 8557.5 | -42.5 |
| 98 | - | 8737.5 | 37.5 |
| 99 | - | 8917.5 | 17.5 |

FIG. 14

| PHYSICAL RESOURCE BLOCK INDEX $n_{PRB}$ OF LTE CELL TO WHICH TRANSMISSION BAND OF NB-IoT CELL CORRESPONDS | | | $(f_{NB\text{-}IoT} - f_{LTE})$ [kHz] | $(f_{raster} - f_{NB\text{-}IoT})$ [kHz] |
|---|---|---|---|---|
| CHANNEL BANDWIDTH 15 MHz | CHANNEL BANDWIDTH 5 MHz | CHANNEL BANDWIDTH 3 MHz | | |
| 0 | - | - | -6667.5 | 32.5 |
| 1 | - | - | -6487.5 | 12.5 |
| 2 | - | - | -6307.5 | -7.5 |
| 3 | - | - | -6127.5 | -27.5 |
| 4 | - | - | -5947.5 | -47.5 |
| 5 | - | - | -5767.5 | 32.5 |
| 6 | - | - | -5587.5 | 12.5 |
| 7 | - | - | -5407.5 | -7.5 |
| 8 | - | - | -5227.5 | -27.5 |
| 9 | - | - | -5047.5 | -47.5 |
| 10 | - | - | -4867.5 | 32.5 |
| 11 | - | - | -4687.5 | 12.5 |
| 12 | - | - | -4507.5 | -7.5 |
| 13 | - | - | -4327.5 | -27.5 |
| 14 | - | - | -4147.5 | -47.5 |
| 15 | - | - | -3967.5 | 32.5 |
| 16 | - | - | -3787.5 | 12.5 |
| 17 | - | - | -3607.5 | -7.5 |
| 18 | - | - | -3427.5 | -27.5 |
| 19 | - | - | -3247.5 | -47.5 |
| 20 | - | - | -3067.5 | 32.5 |
| 21 | - | - | -2887.5 | 12.5 |
| 22 | - | - | -2707.5 | -7.5 |
| 23 | - | - | -2527.5 | -27.5 |
| 24 | - | - | -2347.5 | -47.5 |
| 25 | 0 | - | -2167.5 | 32.5 |
| 26 | 1 | - | -1987.5 | 12.5 |
| 27 | 2 | - | -1807.5 | -7.5 |
| 28 | 3 | - | -1627.5 | -27.5 |
| 29 | 4 | - | -1447.5 | -47.5 |

FIG. 15

| PHYSICAL RESOURCE BLOCK INDEX $n_{PRB}$ OF LTE CELL TO WHICH TRANSMISSION BAND OF NB-IoT CELL CORRESPONDS | | | $(f_{NB\text{-}IoT} - f_{LTE})$ [kHz] | $(f_{raster} - f_{NB\text{-}IoT})$ [kHz] |
|---|---|---|---|---|
| CHANNEL BANDWIDTH 15 MHz | CHANNEL BANDWIDTH 5 MHz | CHANNEL BANDWIDTH 3 MHz | | |
| 30 | 5 | 0 | -1267.5 | 32.5 |
| 31 | 6 | 1 | -1087.5 | 12.5 |
| 32 | 7 | 2 | -907.5 | -7.5 |
| 33 | 8 | 3 | -727.5 | -27.5 |
| 34 | 9 | 4 | -547.5 | -47.5 |
| 35 | 10 | 5 | -367.5 | 32.5 |
| 36 | 11 | 6 | -187.5 | 12.5 |
| 37 | 12 | 7 | 0 | 0 |
| 38 | 13 | 8 | 187.5 | -12.5 |
| 39 | 14 | 9 | 367.5 | -32.5 |
| 40 | 15 | 10 | 547.5 | 47.5 |
| 41 | 16 | 11 | 727.5 | 27.5 |
| 42 | 17 | 12 | 907.5 | 7.5 |
| 43 | 18 | 13 | 1087.5 | -12.5 |
| 44 | 19 | 14 | 1267.5 | -32.5 |
| 45 | 20 | - | 1447.5 | 47.5 |
| 46 | 21 | - | 1627.5 | 27.5 |
| 47 | 22 | - | 1807.5 | 7.5 |
| 48 | 23 | - | 1987.5 | -12.5 |
| 49 | 24 | - | 2167.5 | -32.5 |
| 50 | - | - | 2347.5 | 47.5 |
| 51 | - | - | 2527.5 | 27.5 |
| 52 | - | - | 2707.5 | 7.5 |
| 53 | - | - | 2887.5 | -12.5 |
| 54 | - | - | 3067.5 | -32.5 |
| 55 | - | - | 3247.5 | 47.5 |
| 56 | - | - | 3427.5 | 27.5 |
| 57 | - | - | 3607.5 | 7.5 |
| 58 | - | - | 3787.5 | -12.5 |
| 59 | - | - | 3967.5 | -32.5 |

FIG. 16

| PHYSICAL RESOURCE BLOCK INDEX $n_{PRB}$ OF LTE CELL TO WHICH TRANSMISSION BAND OF NB-IoT CELL CORRESPONDS | | | $(f_{NB\text{-}IoT} - f_{LTE})$ [kHz] | $(f_{raster} - f_{NB\text{-}IoT})$ [kHz] |
|---|---|---|---|---|
| CHANNEL BANDWIDTH 15 MHz | CHANNEL BANDWIDTH 5 MHz | CHANNEL BANDWIDTH 3 MHz | | |
| 60 | - | - | 4147.5 | 47.5 |
| 61 | - | - | 4327.5 | 27.5 |
| 62 | - | - | 4507.5 | 7.5 |
| 63 | - | - | 4687.5 | -12.5 |
| 64 | - | - | 4867.5 | -32.5 |
| 65 | - | - | 5047.5 | 47.5 |
| 66 | - | - | 5227.5 | 27.5 |
| 67 | - | - | 5407.5 | 7.5 |
| 68 | - | - | 5587.5 | -12.5 |
| 69 | - | - | 5767.5 | -32.5 |
| 70 | - | - | 5947.5 | 47.5 |
| 71 | - | - | 6127.5 | 27.5 |
| 72 | - | - | 6307.5 | 7.5 |
| 73 | - | - | 6487.5 | -12.5 |
| 74 | - | - | 6667.5 | -32.5 |

FIG. 17

| CHANNEL BANDWIDTH OF LTE CELL | NB-IoT CHANNEL RASTER | | | |
|---|---|---|---|---|
| | $100 \cdot n - 7.5$ | $100 \cdot n - 2.5$ | $100 \cdot n + 2.5$ | $100 \cdot n + 7.5$ |
| 1.4 MHz | - | - | - | - |
| 3 MHz | 2 | - | - | 12 |
| 5 MHz | 2,7 | - | - | 17,22 |
| 10 MHz | - | 25,30,35,40,45 | 4,9,14,19,24 | - |
| 15 MHz | 2,7,12,17,22,27,32 | - | - | 42,47,52,57,62,67,72 |
| 20 MHz | - | 50,55,60,65,70,75,80,85,90,95 | 4,9,14,19,24,29,34,39,44,49 | - |

FIG. 18

TERMINAL APPARATUS, COMMUNICATION METHOD, AND INTEGRATED CIRCUIT

TECHNICAL FIELD

The present invention relates to a terminal apparatus, a communication method, and an integrated circuit.

This application claims priority based on JP 2016-001557 filed in Japan on Jan. 7, 2016, the contents of which are incorporated herein by reference.

BACKGROUND ART

In the 3rd Generation Partnership Project (3GPP), standardization process for a radio access method and a radio network for cellular mobile communications (hereinafter, referred to as "Long Term Evolution (LTE)", or "Evolved Universal Terrestrial Radio Access (EUTRA)") has been advanced (NPL 1, 2, and 3). In LTE, a base station apparatus is also referred to as an evolved NodeB (eNodeB), and a terminal apparatus is also referred to as User Equipment (UE). LTE is a cellular communication system in which multiple areas covered by base station apparatuses are deployed to form a cellular structure. A single base station apparatus may manage multiple cells.

In the 3GPP, standardization process for Narrow band-Internet of Things (NB-IoT) has been advanced for the purpose of reduction in cost of terminal apparatuses and reduction in power consumption of terminal apparatuses. (NPL 4). For the downlink of NB-IoT, standalone, in-band, and guard band scenarios have been considered. Standalone is a scenario in which downlink of NB-IoT is not included in the channel bandwidth of an LTE cell. In-band is a scenario in which downlink of NB-IoT is included in the transmission bandwidth of an LTE cell. Guard band is a scenario in which downlink of NB-IoT is included in the guard band of an LTE cell.

CITATION LIST

Non Patent Literature

NPL 1: 3GPP TS 36.211 V12.7.0 (2015-09), 25 Sep. 2015.
NPL 2: 3GPP TS 36.212 V12.6.0 (2015-09), 25 Sep. 2015.
NPL 3: 3GPP TS 36.213 V12.7.0 (2015-03), 25 Sep. 2015.
NPL 4: Status Report for WI: NarrowBand IOT, RP-151931, Vodafone, Huawei, Ericsson, Qualcomm, 3GPP TSG RAN Meeting #70, Sitges, Spain, 7-10 Dec. 2015.

SUMMARY OF INVENTION

Technical Problem

The present invention provides a terminal apparatus capable of efficiently communicating with a base station apparatus by using downlink, a base station apparatus for communicating with the terminal apparatus, a communication method used by the terminal apparatus, a communication method used by the base station apparatus, an integrated circuit mounted on the terminal apparatus, and an integrated circuit mounted on the base station apparatus. For example, the communication method used by the terminal apparatus may include a method of efficient cell search of or initial access to an NB-IoT cell by the terminal apparatus.

Solution to Problem (1) According to some aspects of the present invention, the following measures are provided. Specifically, a first aspect of the present invention is a terminal apparatus configured to: acquire synchronization with a cell through cell search; and receive system information associated at least with (i) an operation of NB-IoT and (ii) a raster offset. The raster offset is an offset of downlink carrier frequency from a channel raster of prescribed spacing. The downlink carrier frequency is a carrier frequency of the NB-IoT.

(2) A second aspect of the present invention is a base station apparatus configured to: transmit a synchronization signal to be used for cell search, the cell search being a procedure for acquiring synchronization with a cell; and transmit system information associated at least with (i) an operation of NB-IoT and (ii) a raster offset. The raster offset is an offset of downlink carrier frequency from a channel raster of prescribed spacing, and the downlink carrier frequency is a carrier frequency of the NB-IoT.

(3) A third aspect of the present invention is a communication method used for a terminal apparatus, the communication method including the steps of: acquiring synchronization with a cell through cell search; and receiving system information associated at least with (i) an operation of NB-IoT and (ii) a raster offset. The raster offset is an offset of downlink carrier frequency from a channel raster of prescribed spacing, and the downlink carrier frequency is a carrier frequency of the NB-IoT.

(4) A fourth aspect of the present invention is a communication method used for a base station apparatus, the communication method including the steps of: transmitting a synchronization signal to be used for cell search, the cell search being a procedure for acquiring synchronization with a cell; and transmitting system information associated at least with (i) an operation of NB-IoT and (ii) a raster offset. The raster offset is an offset of downlink carrier frequency from a channel raster of prescribed spacing, and the downlink carrier frequency is a carrier frequency of the NB-IoT.

Advantageous Effects of Invention

According to the present invention, the terminal apparatus and the base station apparatus can efficiently communicate with each other by using downlink.

BRIEF DESCRIPTION OF DRAWINGS

FIG. 4 is a table illustrating an example of a channel bandwidth and a transmission bandwidth of a serving cell according to the present embodiment.

FIG. 11 is a table illustrating a difference ($f_{NB\text{-}IoT} - f_{LTE}$) kHz between a carrier center frequency of an NB-IoT cell included in a transmission bandwidth of an LTE cell having a channel bandwidth of 10 MHz or 20 MHz and a carrier center frequency of the LTE cell in the present embodiment.

FIG. 12 is a table illustrating the difference ($f_{NB\text{-}IoT} - f_{LTE}$) kHz between the carrier center frequency of the NB-IoT cell included in the transmission bandwidth of the LTE cell having a channel bandwidth of 10 MHz or 20 MHz and the carrier center frequency of the LTE cell in the present embodiment.

FIG. 13 is a table illustrating the difference ($f_{NB\text{-}IoT} - f_{LTE}$) kHz between the carrier center frequency of the NB-IoT cell included in the transmission bandwidth of the LTE cell having a channel bandwidth of 10 MHz or 20 MHz and the carrier center frequency of the LTE cell in the present embodiment.

FIG. 14 is a table illustrating the difference ($f_{NB\text{-}IoT} - f_{LTE}$) kHz between the carrier center frequency of the NB-IoT cell included in the transmission bandwidth of the LTE cell having a channel bandwidth of 10 MHz or 20 MHz and the carrier center frequency of the LTE cell in the present embodiment.

FIG. 15 is a table illustrating the difference ($f_{NB\text{-}IoT} - f_{LTE}$) kHz between a carrier center frequency of an NB-IoT cell included in a transmission bandwidth of an LTE cell having a channel bandwidth of 3 MHz, 5 MHz, or 15 MHz and a carrier center frequency of the LTE cell in the present embodiment.

FIG. 16 is a table illustrating the difference ($f_{NB\text{-}IoT} - f_{LTE}$) kHz between the carrier center frequency of the NB-IoT cell included in the transmission bandwidth of the LTE cell having a channel bandwidth of 3 MHz, 5 MHz, or 15 MHz and the carrier center frequency of the LTE cell in the present embodiment.

FIG. 17 is a table illustrating the difference ($f_{NB\text{-}IoT} - f_{LTE}$) kHz between the carrier center frequency of the NB-IoT cell included in the transmission bandwidth of the LTE cell having a channel bandwidth of 3 MHz, 5 MHz, or 15 MHz and the carrier center frequency of the LTE cell in the present embodiment.

FIG. 18 is a table illustrating an example of a relationship between each channel raster and a physical resource index (indices) of an LTE cell to which an NB-IoT cell that can be detected in the channel raster corresponds, in the present embodiment.

DESCRIPTION OF EMBODIMENTS

An embodiment of the present invention will be described below.

Long Term Evolution (LTE) (trade name) and Narrow Band Internet of Things (NB-IoT) may be defined as different Radio Access Technologies (RATs). NB-IoT may be defined as a technology included in LTE.

Figure 1:
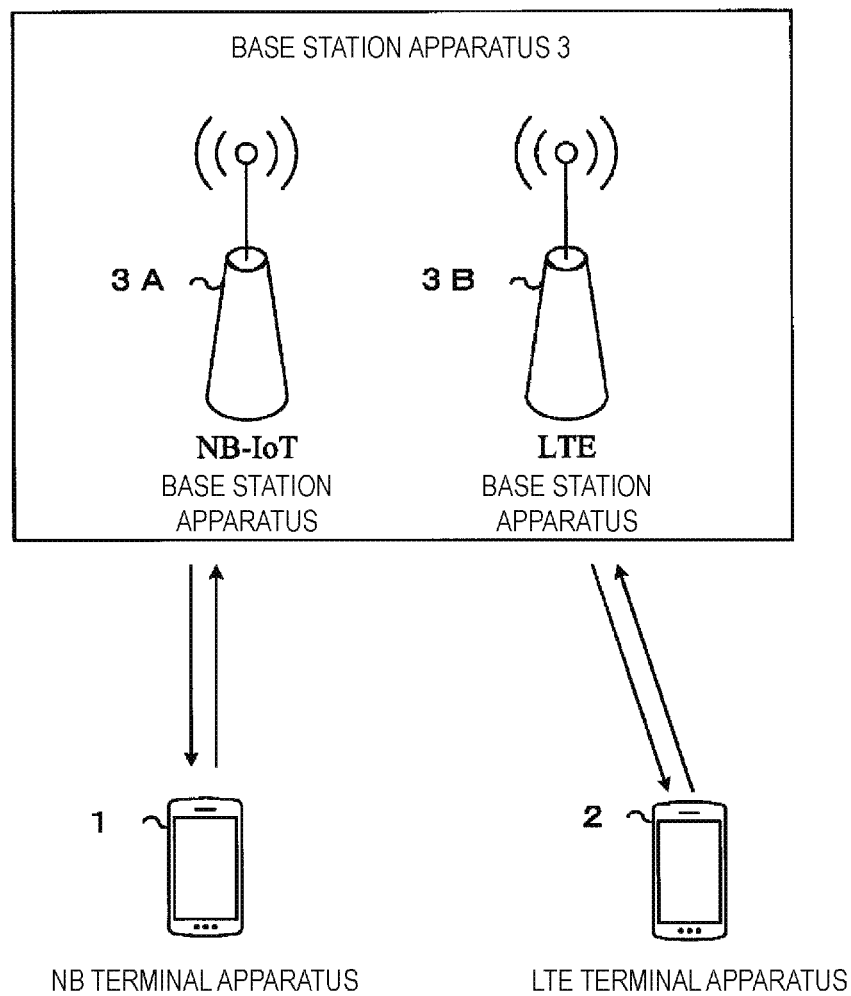
FIG. 1 is a conceptual diagram of a radio communication system according to the present embodiment.

FIG. 1 is a conceptual diagram of a radio communication system according to the present embodiment. In FIG. 1, the radio communication system includes an NB terminal apparatus 1, an LTE terminal apparatus 2, and a base station apparatus 3. The base station apparatus 3 includes an NB base station apparatus 3A and an LTE base station apparatus 3B. The NB base station apparatus 3A and the LTE base station apparatus 3B may be defined as different apparatuses. The base station apparatus 3 may include a core network apparatus.

The NB terminal apparatus 1 and the NB base station apparatus 3A support NB-IoT. The NB terminal apparatus 1 and the NB base station apparatus 3A communicate with each other using NB-IoT. The LTE terminal apparatus 2 and the LTE base station apparatus 3B support LTE. The LTE terminal apparatus 2 and the LTE base station apparatus 3B communicate with each other using LTE.

Time Division Duplex (TDD) and/or Frequency Division Duplex (FDD) is applied to a radio communication system according to the present embodiment. In the present embodiment, one serving cell is configured for the terminal apparatus 1. The serving cell configured for the terminal apparatus 1 is also referred to as an NB cell. A serving cell configured for the LTE terminal apparatus 2 is also referred to as an LTE cell.

The one serving cell thus configured may be one primary cell. The primary cell is a serving cell in which an initial connection establishment procedure has been performed, a serving cell in which a connection re-establishment procedure has been started, or a cell indicated as a primary cell during a handover procedure.

A carrier corresponding to a serving cell in downlink is referred to as a downlink component carrier. A carrier corresponding to a serving cell in uplink is referred to as an uplink component carrier. The downlink component carrier and the uplink component carrier are collectively referred to as a component carrier.

The present embodiment may be applied to three scenarios, i.e., standalone, guard band, and in-band. Standalone is a scenario in which downlink of NB-IoT is not included in the channel bandwidth of an LTE cell. Guard band is a scenario in which downlink of NB-IoT is included in the guard band of an LTE cell. In-band is a scenario in which downlink of NB-IoT is included in the transmission bandwidth of an LTE cell. For example, the guard band of an LTE cell is a band that is included in the channel bandwidth of the LTE while not being included in the transmission bandwidth of the LTE cell.

Figure 2:
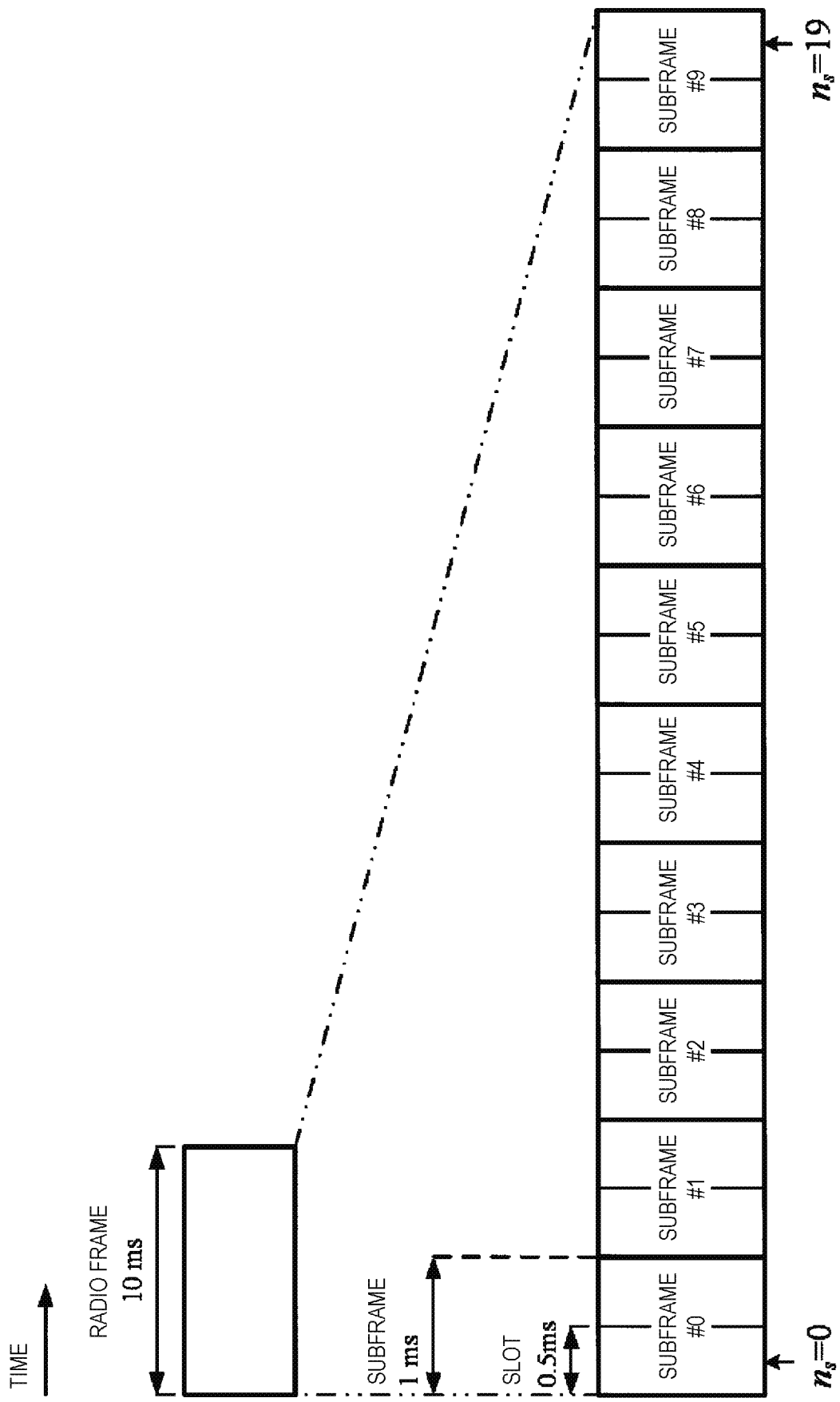
FIG. 2 is a diagram illustrating a schematic configuration of a radio frame according to the present embodiment.

FIG. 2 is a diagram illustrating a configuration of the radio frame according to the present embodiment. In FIG. 2, the horizontal axis is a time axis. The configuration of the radio frame in FIG. 2 may be applied to both NB-IoT and LTE.

The size of each of various fields in the time domain is expressed by the value of a time unit $T_s = 1/(15000*2048)$ seconds. The length of the radio frame is $T_f = 307200*T_s = 10$ ms. Each radio frame includes 10 subframes that are consecutive in the time domain. The length of each subframe is $T_{subframe} = 30720*T_s = 1$ ms. Each subframe i includes two slots that are consecutive in the time domain. The two slots that are consecutive in the time domain are a slot having a slot number $n_s$ of 2i in the radio frame and a slot having the slot number $n_s$ of 2i+1 in the radio frame. The length of each slot is $T_{slot}=153600*n_s=0.5$ ms. Each radio frame includes 10 subframes that are consecutive in the time domain. Each radio frame includes 20 slots ($n_s=0, 1, \ldots, 19$) that are consecutive in the time domain.

Figure 3:
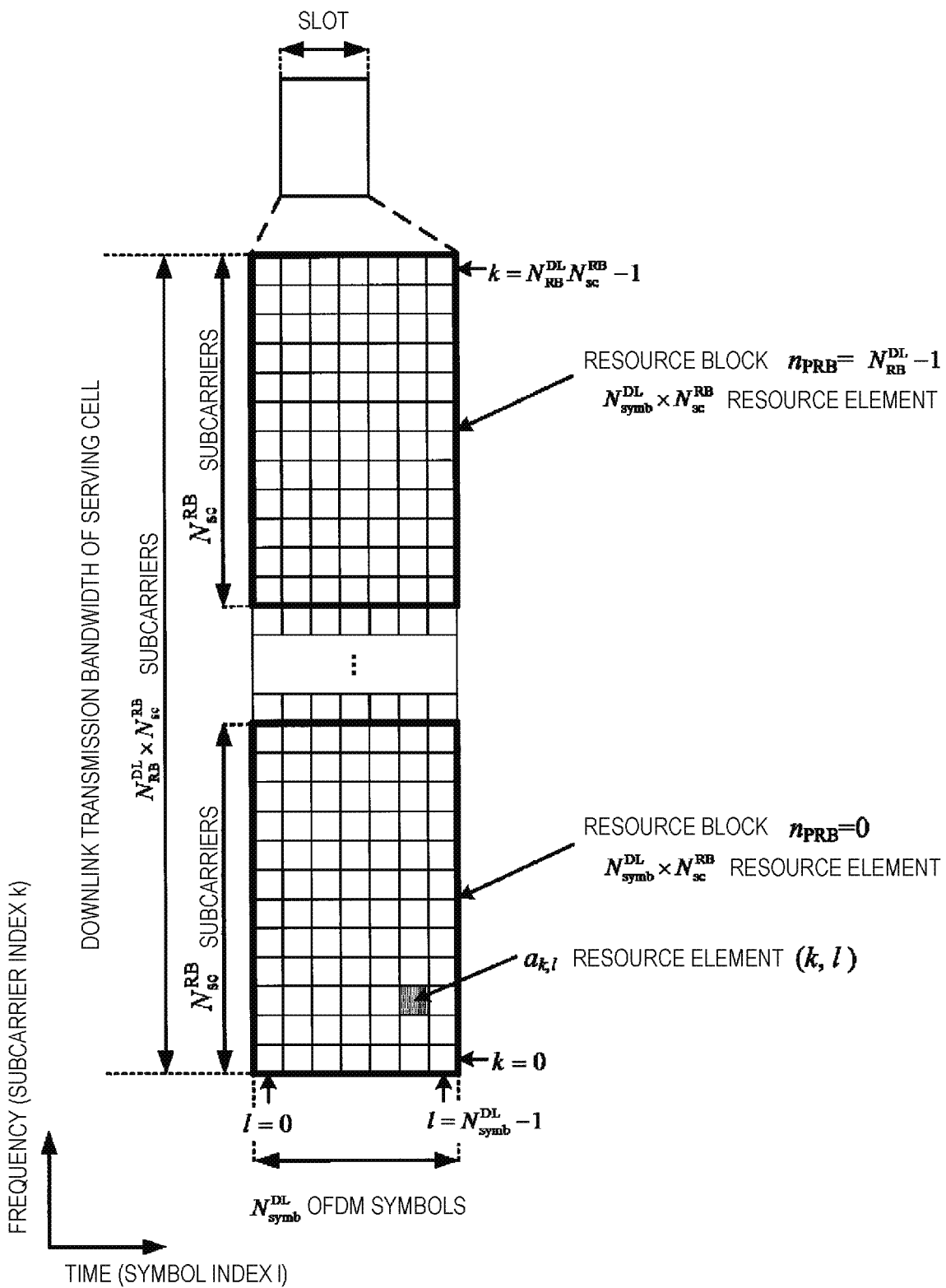
FIG. 3 is a diagram illustrating a schematic configuration of a downlink slot according to the present embodiment.

A configuration of a slot in the present embodiment will be described below. FIG. 3 is a diagram illustrating a schematic configuration of a downlink slot according to the present embodiment. The configuration of the slot in FIG. 3 may be applied to both NB-IoT and LTE. FIG. 3 illustrates a configuration of the downlink slot in one cell. In FIG. 3, the horizontal axis is a time axis, and the vertical axis is a frequency axis. In FIG. 3, 1 denotes an orthogonal frequency-division multiplexing (OFDM) symbol number/index, and k denotes a subcarrier number/index.

The physical signal or the physical channel transmitted in each slot is expressed by a resource grid. In downlink, the resource grid is defined by multiple subcarriers and multiple OFDM symbols. Each element within the resource grid is referred to as a resource element. The resource element is expressed by the subcarrier number/index k and the OFDM symbol number/index 1.

The resource grid is defined for each antenna port. In the present embodiment, a description will be given for one antenna port. The present embodiment may be applied to each of multiple antenna ports.

The downlink slot includes multiple OFDM symbols 1 ($1=0, 1, \ldots, N^{DL}_{symb}$) in the time domain. $N^{DL}_{symb}$ denotes the number of OFDM symbols included in one downlink slot. For a normal Cyclic Prefix (CP), $N^{DL}_{symb}$ is 7. For an extended Cyclic Prefix (CP), $N^{DL}_{symb}$ is 6.

The downlink slot includes multiple subcarriers k ($k=0, 1, \ldots, N^{DL}_{RB}*N^{RB}_{sc}$) in the frequency domain. $N^{DL}_{RB}$ is a downlink bandwidth configuration for a serving cell expressed by a multiple of $N^{RB}_{sc}$. $N^{RB}_{sc}$ denotes a (physical) resource block size in the frequency domain expressed by the number of subcarriers. In the present embodiment, the subcarrier spacing $\Delta f$ is 15 kHz, and $N^{RB}_{sc}$ is 12 subcarriers. In other words, $N^{RB}_{sc}$ is 180 kHz in the present embodiment.

A resource block is used to express mapping of a physical channel to resource elements. For the resource block, a virtual resource block (VRB) and a physical resource block (PRB) are defined. A physical channel is first mapped to a virtual resource block. Thereafter, the virtual resource block is mapped to a physical resource block. One physical resource block is defined by OFDM symbols having $N^{DL}_{symb}$ that are consecutive in the time domain and by subcarriers having $N^{RB}_{sc}$ that are consecutive in the frequency domain. Hence, one physical resource block is constituted by ($N^{DL}_{symb}*N^{RB}_{sc}$) resource elements. One physical resource block corresponds to one slot in the time domain. Physical resource blocks are numbered/indexed (0, 1, \ldots, $N^{DL}_{RB}-1$) from the one having the lowest frequency, in the frequency domain.

Physical channels and physical signals according to the present embodiment will be described.

In FIG. 1, the following downlink physical channels are used for downlink radio communication from the base station apparatus 3B to the LTE terminal apparatus 2. The downlink physical channels are used by the physical layer for transmission of information output from higher layers.
Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

PBCH is used for broadcasting of a Master Information Block (MIB) (or a Broadcast Channel (BCH)) that is shared by LTE terminal apparatuses 2.

PCFICH is used for transmission of information indicating a region (OFDM symbols) to be used for transmission of PDCCH in the subframe for transmission of PCFICH.

PHICH is used for transmission of a HARQ indicator indicating an Acknowledgement (ACK) or a Negative Acknowledgement (NACK) for the uplink data (Uplink Shared Channel (UL-SCH)) received by the base station apparatus 3.

PDCCH and EPDCCH are used for transmission of Downlink Control Information (DCI).

PDSCH is used for transmission of downlink data (Downlink Shared channel (DL-SCH)).

PMCH is used for transmission of multicast data (Multicast Channel (MCH)).

In FIG. 1, the following downlink physical channels are used for downlink radio communication from the base station apparatus 3B to the LTE terminal apparatus 2. The downlink physical signals are not used to transmit the information output from the higher layer but are used by the physical layer.
Synchronization signal (SS)
Downlink Reference Signal (DL RS)

The synchronization signal is used in order for the LTE terminal apparatus 2 to acquire time and frequency synchronization in the downlink of the LTE cell. The synchronization signal is mapped to the center of the LTE cell.

The downlink reference signal may be used in order for the LTE terminal apparatus 2 to perform channel compensation on the downlink physical channel of the LTE cell. The downlink reference signal may be used in order for the LTE terminal apparatus 2 to calculate the downlink channel state information of the LTE cell.

According to the present embodiment, the following seven types of downlink reference signals are used.
Cell-specific Reference Signal (CRS)
UE-specific Reference Signal (URS) associated with PDSCH
Demodulation Reference Signal (DMRS) associated with EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference signal (MBSFN RS)
Positioning Reference Signal (PRS)

In FIG. 1, the following downlink physical channels are used for downlink radio communication from the base station apparatus 3A to the terminal apparatus 1. The downlink physical channels are used by the physical layer for transmission of information output from higher layers.
Narrow Band Physical Broadcast Channel (NB-PBCH)
Narrow Band Physical Downlink Control Channel (NB-PDCCH)
Narrow Band Physical Downlink Shared Channel (NB-PDSCH)

NB-PBCH is used for broadcasting of system information that is commonly used by terminal apparatuses 1.

NB-PDCCH is used for transmission of downlink control information (Narrow Band Downlink Control Information, DCI) used for scheduling of NB-PDSCH.

NB-PDSCH is used for transmission of downlink data (Downlink Shared Channel (DL-SCH)).

In FIG. 1, the following downlink physical signals are used for downlink radio communication from the base station apparatus 3A to the terminal apparatus 1. The downlink physical signals are not used for transmission of information output from higher layers but are used by the physical layer.

Narrow Band Synchronization Signal (NB-SS)

Narrow Band Downlink Reference Signal (NB-DL RS)

NB-SS is used in order for the terminal apparatus 1 to acquire time and frequency synchronization in the downlink of the NB-IoT cell.

NB-DL RS is used in order for the terminal apparatus 1 to perform channel compensation on the downlink physical channel of the NB-IoT cell. NB-DL RS may be used in order for the terminal apparatus 1 to calculate the downlink channel state information of the NB-IoT cell. Here, NB-DL RS is used to perform channel compensation on NB-PBCH.

In the case of the in-band scenario, CRS is included in the transmission bandwidth of the NB-IoT cell. CRS included in the transmission bandwidth of the NB-IoT cell may be defined as NB-CRS. NB-CRS may be included in the transmission bandwidth of the NB-IoT cell also in the case of the standalone and guard band scenarios.

NB-CRS may be used in order for the terminal apparatus 1 to perform channel compensation on a downlink physical channel of the NB-IoT cell. NB-CRS may be used in order for the terminal apparatus 1 to calculate downlink channel state information of the NB-IoT cell. Here, NB-CRS is not used to perform channel compensation on NB-PBCH.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

DL-SCH is a transport channel. A channel used in the Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

The base station apparatus 3 and the terminal apparatus 1 exchange (transmit and/or receive) signals with each other in their respective higher layers. For example, the base station apparatus 3 and the terminal apparatus 1 may transmit and receive, in a Radio Resource Control layer, RRC signaling (also referred to as Radio Resource Control message (RRC message) or Radio Resource Control information (RRC information)) to and from each other. The base station apparatus 3 and the terminal apparatus 1 may transmit and/or receive a Medium Access Control (MAC) Control Element (CE) in the MAC layer. Here, the RRC signaling and/or the MAC CE is also referred to as higher layer signaling.

PDSCH is used to transmit the RRC signaling and the MAC CE. Here, the RRC signaling transmitted on PDSCH from the base station apparatus 3 may be signaling common to multiple terminal apparatuses 1 in a cell. The RRC signaling transmitted on PDSCH from the base station apparatus 3 may be signaling dedicated to a certain terminal apparatus 1 (also referred to as dedicated signaling or UE specific signaling). Cell-specific parameters may be transmitted through the signaling common to multiple terminal apparatuses 1 in a cell or through the signaling dedicated to a certain terminal apparatus 1. UE-specific parameters may be transmitted through the signaling dedicated to a certain terminal apparatus 1.

FIG. 4 is a table illustrating an example of a channel bandwidth and a transmission bandwidth of a serving cell according to the present embodiment. The transmission bandwidths are expressed by multiples of $N^{RB}_{sc}$, each of which is a physical resource block size in the frequency domain. The channel bandwidth of the NB-IoT cell is 0.2 MHz, and the transmission bandwidth of the NB-IoT is 1 PRB. The channel bandwidth of the LTE cell is any of {1.4 MHz, 3 MHz, 5 MHz, 10 MHz, 15 MHz, 20 MHz}. The transmission bandwidth of the LTE cell is any of {6 PRB, 15 PRB, 25 PRB, 50 PRB, 75 PRB, 100 PRB}. The maximum transmission bandwidth $N^{max,DL}_{RB}$ of the LTE cell is 100.

Figure 5:
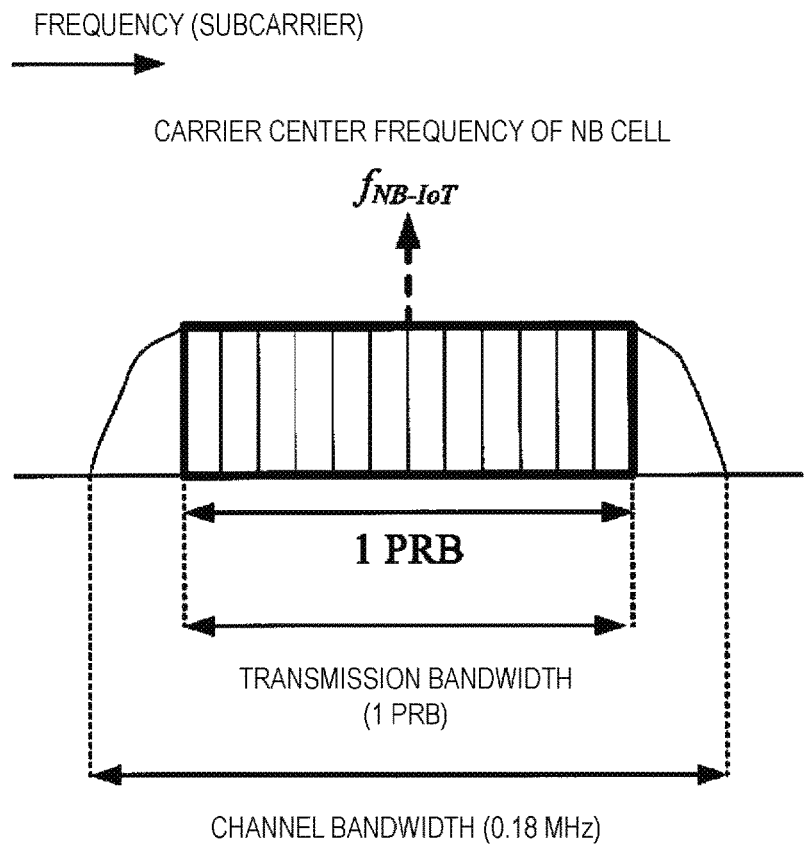
FIG. 5 is a diagram illustrating an example of a channel bandwidth configuration of an NB-IoT cell according to the present embodiment.
Figure 6:
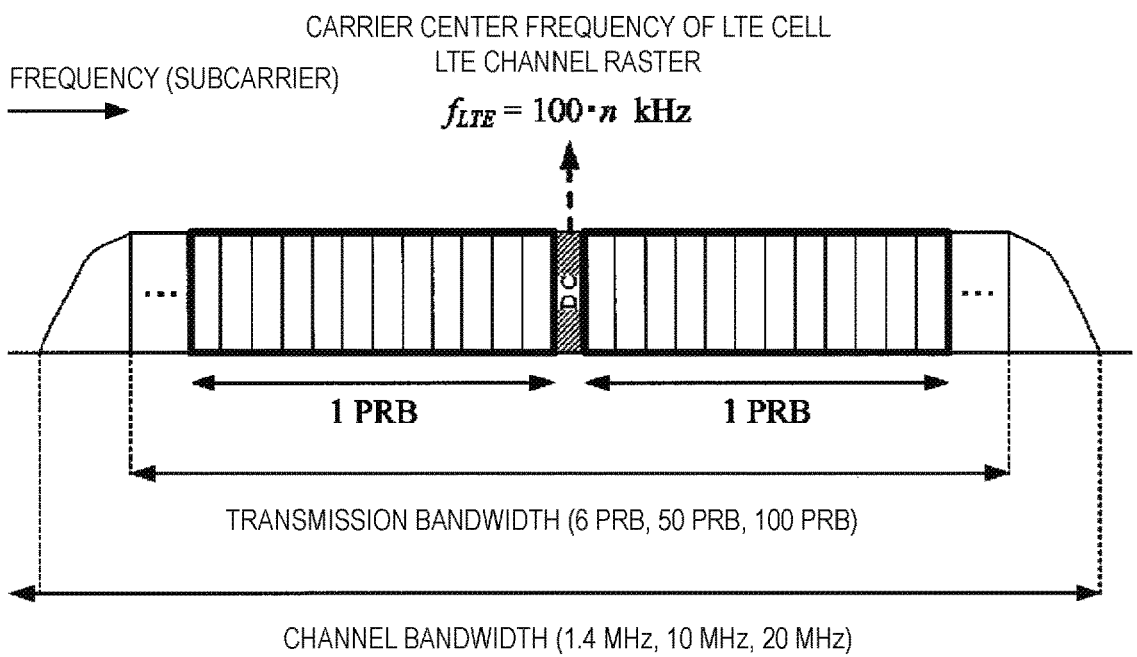
FIG. 6 is a diagram illustrating an example of a channel bandwidth configuration {1.4 MHz, 10 MHz, 20 MHz} of an LTE cell according to the present embodiment.
Figure 7:
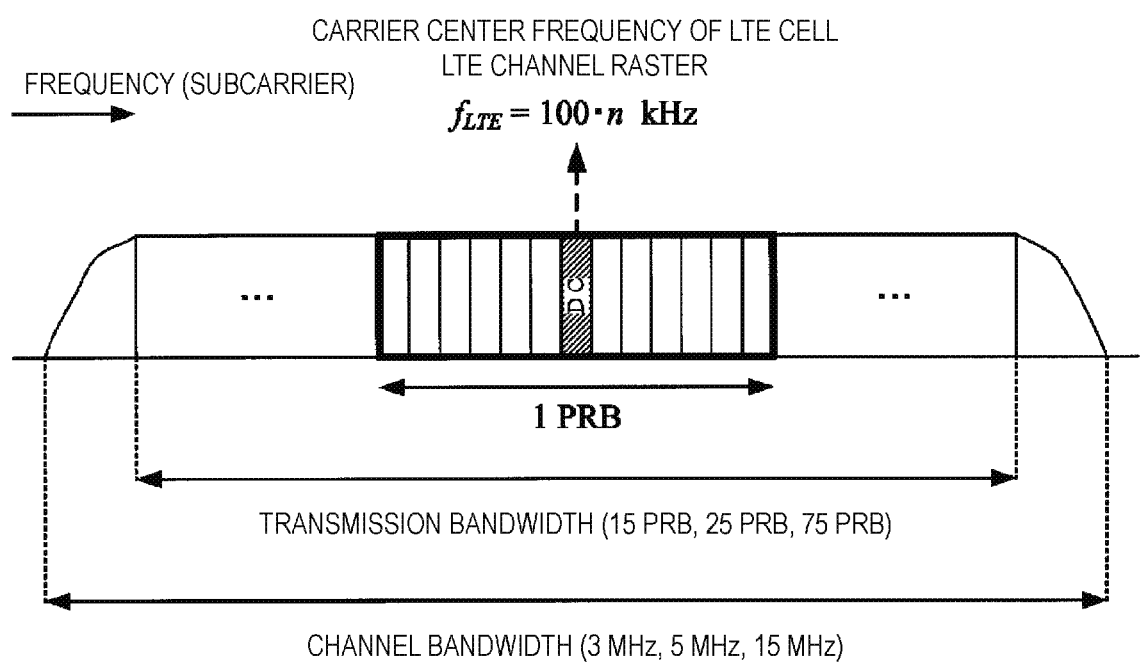
FIG. 7 is a diagram illustrating an example of a channel bandwidth configuration {3 MHz, 5 MHz, 15 MHz} of an LTE cell according to the present embodiment.

FIG. 5 is a diagram illustrating an example of a channel bandwidth configuration of the NB-IoT cell according to the present embodiment. FIG. 6 is a diagram illustrating an example of a channel bandwidth configuration {1.4 MHz, 10 MHz, 20 MHz} of an LTE cell according to the present embodiment. FIG. 7 is a diagram illustrating an example of a channel bandwidth configuration {3 MHz, 5 MHz, 15 MHz} of an LTE cell according to the present embodiment.

The NB-IoT cell does not include one unused subcarrier. The LTE cell includes one unused subcarrier. The one non-specific subcarrier is at the center of the LTE cell. The physical resource block at the center of the LTE cell having the channel bandwidth configuration {3 MHz, 5 MHz, 15 MHz} is defined by excluding the one non-specific subcarrier. The physical resource block at the center of the LTE cell having the channel bandwidth configuration {3 MHz, 5 MHz, 15 MHz} need not be used for NB-IoT.

A carrier center frequency $f_{LTE}$ of the LTE cell is a multiple of 100 kHz. The LTE terminal apparatus 2 may perform LTE cell search for every 100 kHz. In other words, an LTE channel raster is 100 kHz. LTE cell search is a procedure performed by the LTE terminal apparatus 2 to acquire time and frequency synchronization with the LTE cell to detect a Physical layer Cell Identity (PCI) of the LTE cell. The LTE terminal apparatus 2 may use a synchronization signal for LTE cell search. LTE cell search is a procedure performed by the LTE terminal apparatus 2 to acquire time and frequency synchronization with the LTE cell to detect a Physical layer Cell Identity (PCI) of the LTE cell. NB-IoT cell search is a procedure performed by the terminal apparatus 1 to acquire time and frequency synchronization with the NB-IoT cell to detect a Physical layer Cell Identity (PCI) of the NB-IoT cell. PCI is also referred to as a cell identity.

The carrier center frequency may also be referred to as a carrier frequency or a center frequency.

Figure 8:
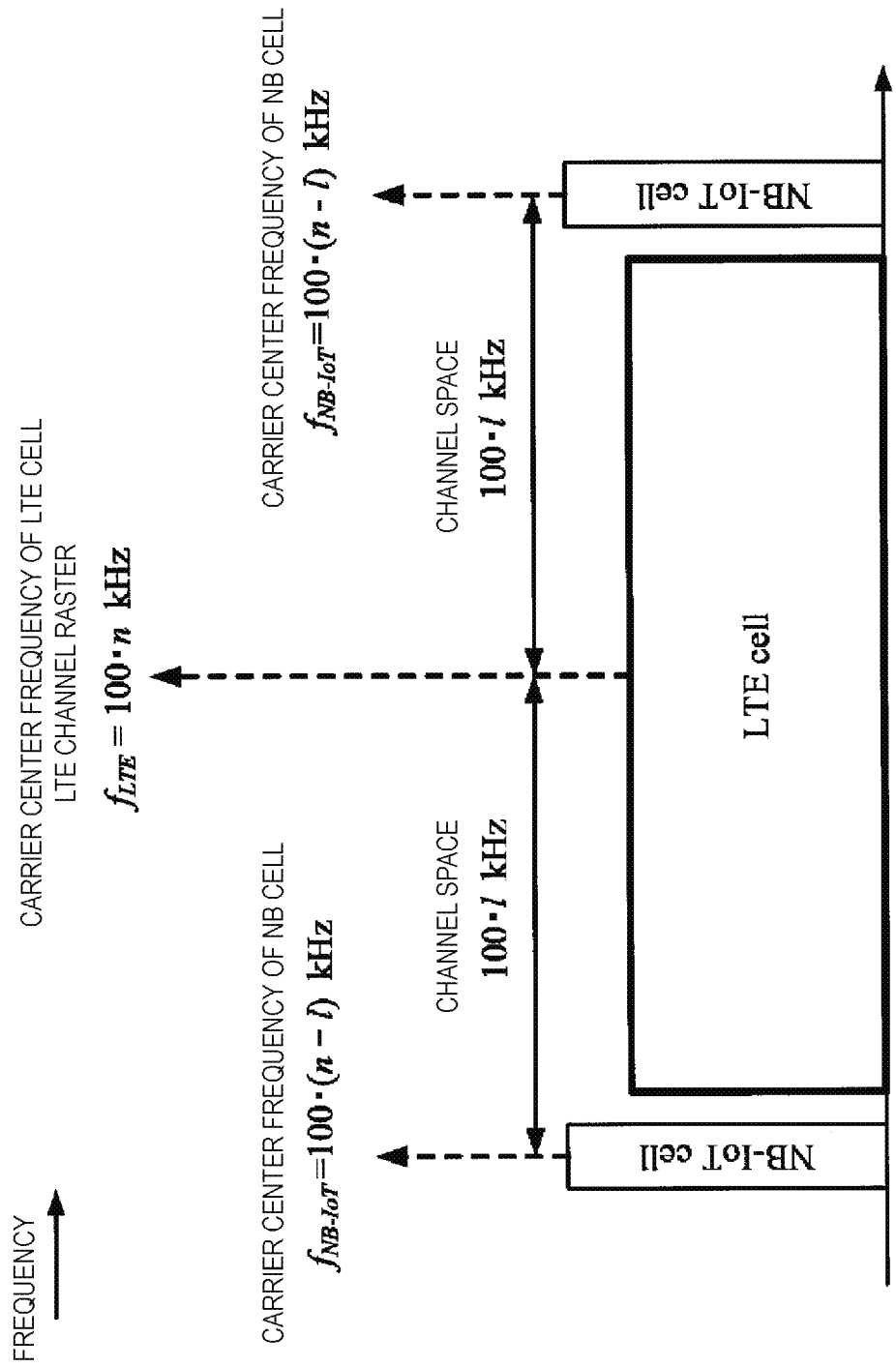
FIG. 8 is a diagram illustrating an example of a carrier center frequency of an NB-IoT cell in a standalone scenario according to the present embodiment.

FIG. 8 is a diagram illustrating an example of a carrier center frequency of an NB-IoT cell in the standalone scenario according to the present embodiment. In the standalone scenario, the carrier center frequency $f_{NB-IoT}$ of the NB-IoT cell may be a multiple of 100 kHz. The carrier center frequency $f_{NB-IoT}$ of the NB-IoT cell may be given according to Equation (1). Here, n is a positive integer in Equation (1).

$$f_{NB-IoT}=100*n \text{ [kHz]} \quad \text{(Equation 1)}$$

In the in-band scenario, the carrier center frequency of the NB-IoT cell included in the guard band of the LTE cell need not be the same as the center frequency of the physical resource block of the LTE cell. Here, the difference (channel space) between the carrier center frequency of the NB-IoT cell and the carrier center frequency of the LTE cell may be a multiple of 300 kHz. 300 kHz is the least common multiple of the downlink subcarrier spacing of 15 kHz and the channel raster of 100 kHz. Accordingly, the carrier center frequency of the NB-IoT cell is a multiple of 100 kHz, and hence the terminal apparatus 1 can detect the NB-IoT cell by cell search based on the channel raster of 100 kHz. Moreover, each spacing of the subcarriers of the NB-IoT cell and the subcarriers of the LTE cell is a multiple of 15 kHz, and thus interference between the subcarriers of the NB-IoT cell and the subcarriers of the LTE cell can be suppressed. However, in a case that the carrier center frequency of the NB-IoT cell included in the guard band of the LTE cell is not the same as the center frequency of the physical resource block of the LTE cell, LTE channel transmission in multiple physical resource blocks in the LTE cell needs to be stopped for the NB-IoT cell. This reduces frequency efficiency. To prevent such a state, it is assumed, in the present embodiment describe below, that the carrier center frequency of the NB-IoT cell included in the guard band of the LTE cell is the same as the center frequency of the physical resource block of the LTE cell.

Figure 9:
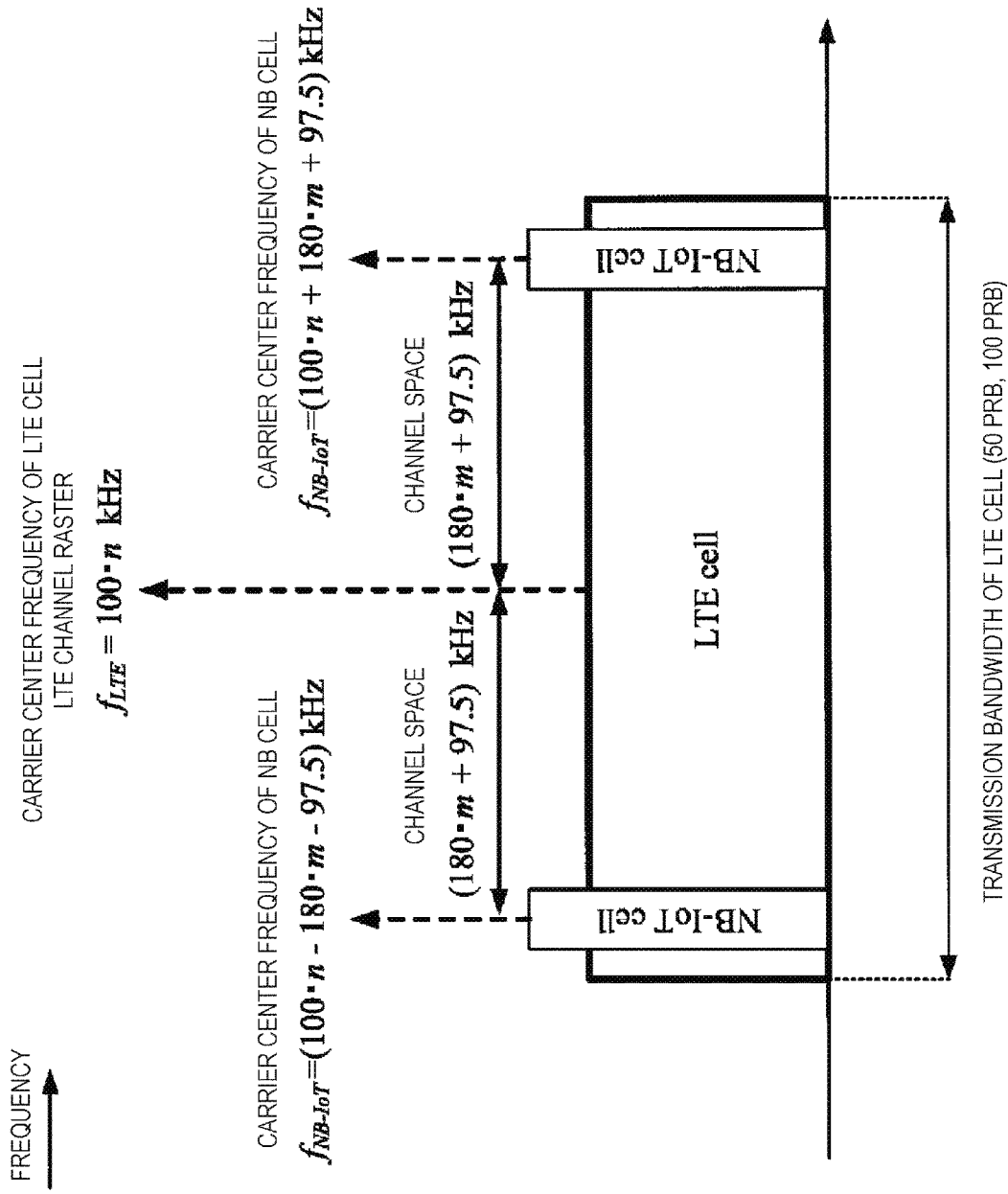
FIG. 9 is a diagram illustrating an example of a carrier center frequency of an NB-IoT cell in an in-band scenario according to the present embodiment.
Figure 10:
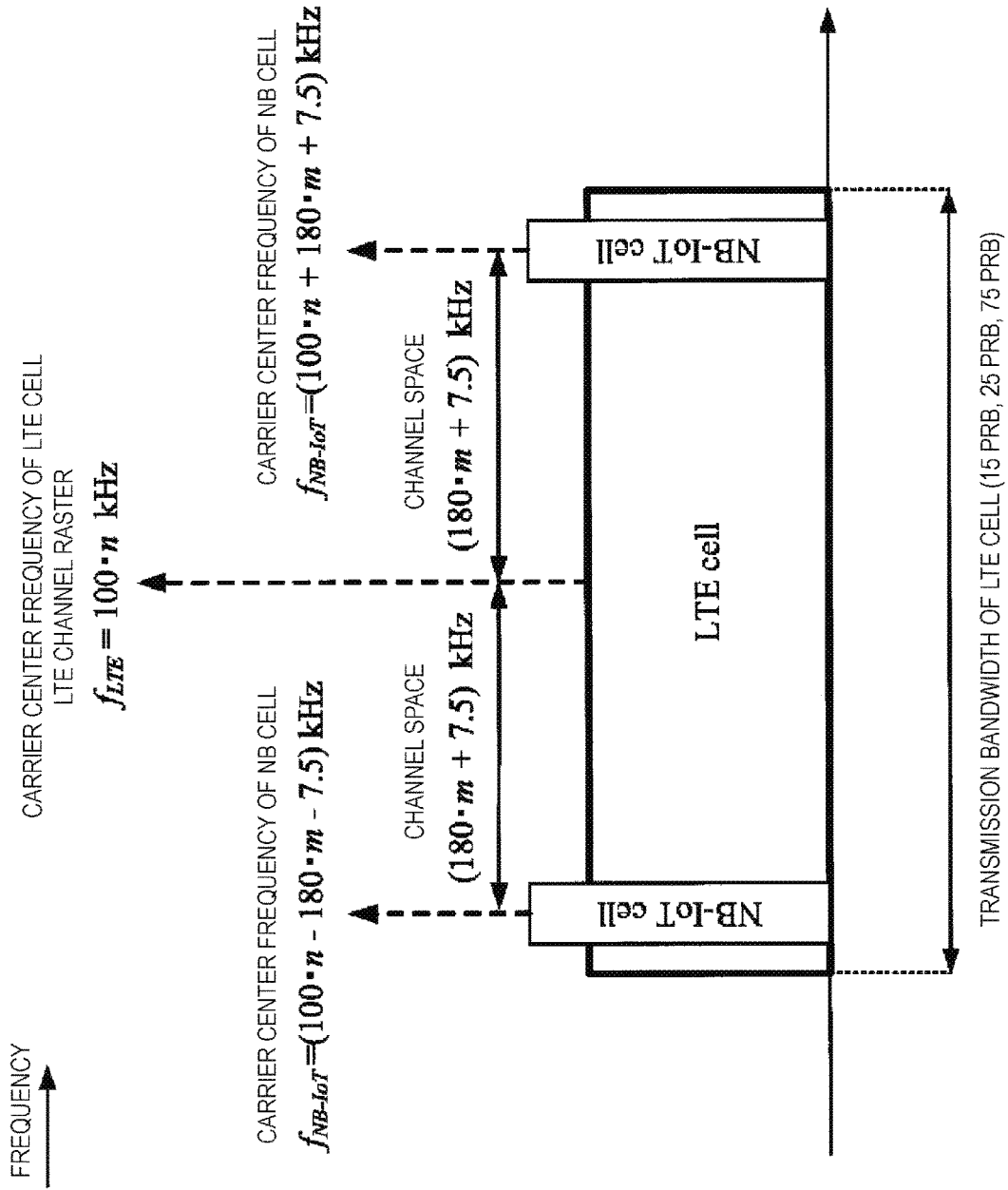
FIG. 10 is a diagram illustrating an example of the carrier center frequency of the NB-IoT cell in the in-band scenario according to the present embodiment.

FIG. 9 and FIG. 10 are diagrams illustrating examples of the carrier center frequency of the NB-IoT cell in the in-band scenario according to the present embodiment. The carrier center frequency of the NB-IoT cell included in the transmission bandwidth of the LTE cell is the same as the center frequency of the physical resource block of the LTE cell. In other words, the transmission band of the NB-IoT cell included in the transmission bandwidth of the LTE cell matches the transmission band of one physical resource block of the LTE cell.

The carrier center frequency of the NB-IoT cell included in the LTE cell having a channel bandwidth of 10 MHz or 20 MHz may be given according to Equation (2) or Equation (3). The carrier center frequency of an NB-IoT cell included in the LTE cell having a channel bandwidth of 3 MHz, 5 MHz, or 15 MHz may be given according to Equation (4) or Equation (5). Here, n and m are positive integers in Equation (2) to Equation (5).

$$f_{NB-IoT}=100*n-180*m-97.5 \text{ (kHz)} \quad \text{(Equation 2)}$$

$$f_{NB-IoT}=100*n+180*m+97.5 \text{ (kHz)} \quad \text{(Equation 3)}$$

$$f_{NB-IoT}=100*n-180*m-7.5 \text{ (kHz)} \quad \text{(Equation 4)}$$

$$f_{NB-IoT}=100*n+180*m+7.5 \text{ (kHz)} \quad \text{(Equation 5)}$$

The difference (channel space) between the carrier center frequency of the NB-IoT cell included in the LTE cell having a transmission bandwidth of 50 or 100 and the carrier center frequency of the LTE cell is (180*m+97.5) kHz. The difference (channel space) between the carrier center frequency of the NB-IoT cell included in the LTE cell having a transmission bandwidth of 15, 25, or 75 and the carrier center frequency of the LTE cell is (180*m+7.5) kHz.

The difference (channel space) between the carrier center frequency of the NB-IoT cell included in the guard band of the LTE cell and the carrier center frequency of the LTE cell may be a multiple of 300 kHz in the guard band operation scenario. 300 kHz is the least common multiple of the downlink subcarrier spacing of 15 kHz and the channel raster of 100 kHz. Accordingly, the carrier center frequency of the NB-IoT cell is a multiple of 100 kHz, and hence the terminal apparatus 1 can detect the NB-IoT cell by cell search, based on the channel raster of 100 kHz. Moreover, each spacing of the subcarriers of the NB-IoT cell and the subcarriers of the LTE cell is a multiple of 15 kHz, and thus interference between the subcarriers of the NB-IoT cell and the subcarriers of the LTE cell can be suppressed.

In the guard band operation scenario, the carrier center frequency of the NB-IoT cell included in the guard band of the LTE cell having a channel bandwidth of 10 MHz or 20 MHz may be given according to Equation (2) or Equation (3), and the carrier center frequency of the NB-IoT cell included in the guard band of the LTE cell having a channel bandwidth of 3 MHz, 5 MHz, or 15 MHz may be given according to Equation (4) or Equation (5). Hence, each spacing of the subcarriers of the NB-IoT cell and the subcarriers of the LTE cell is a multiple of 15 kHz, and thus interference between the subcarriers of the NB-IoT cell and the subcarriers of the LTE cell can be suppressed.

However, the center frequency of the physical resource block included in the transmission bandwidth of the LTE cell having a carrier center frequency of a multiple of 100 kHz is not a multiple of 100 kHz, and the carrier center frequency of the NB-IoT cell given according to any one of Equation (2) to Equation (5) is not a multiple of 100 kHz. In other words, it is not possible for the terminal apparatus 1 to detect the NB-IoT cell having the carrier center frequency given according to any one of Equation (2) to Equation (5), based on the channel raster of 100 kHz.

Each of FIG. 11 to FIG. 14 is a table illustrating the difference ($f_{NB-IoT}-f_{LTE}$) kHz between a carrier center frequency of an NB-IoT cell included in the transmission bandwidth of the LTE cell having a channel bandwidth of 10 MHz or 20 MHz and the carrier center frequency of the LTE cell in the present embodiment. Each of FIG. 15 to FIG. 17 is a table illustrating the difference ($f_{NB-IoT}-f_{LTE}$) kHz between a carrier center frequency of an NB-IoT cell included in the transmission bandwidth of the LTE cell having a channel bandwidth of 3 MHz, 5 MHz, or 15 MHz and the carrier center frequency of the LTE cell in the present embodiment. In FIG. 11 to FIG. 17, $f_{raster}$ denotes a channel raster of 100 kHz closest to the carrier center frequency of the NB-IoT cell. In other words, in FIG. 11 to FIG. 17, ($f_{raster}-f_{NB-IoT}$) kHz denotes the difference between the channel raster of 100 kHz closest to the carrier center frequency of the NB-IoT cell and the carrier center frequency of the NB-IoT.

For example, in FIG. 11, in a case that the NB-IoT cell corresponds to the physical resource block having a physical resource block index $n_{PRB}$ in the LTE cell having a channel bandwidth of 20 MHz, ($f_{NB-IoT}-f_{LTE}$) is −8917.5 kHz, $f_{raster}$ is −8900 kHz, and ($f_{raster}-f_{NB-IoT}$) is −17.5 k kHz.

Here, by applying a channel raster offset of "X" kHz to the channel raster of 100 kHz, the terminal apparatus 1 can detect an NB-IoT cell having ($f_{raster}-f_{NB-IoT}$) of "X" kHz. In a case that the channel raster offset of "X" kHz is applied to the channel raster of 100 kHz, the terminal apparatus 1 performs cell search in (100*n+X) kHz. Here, n is an integer.

For example, by applying a channel raster offset of 2.5 kHz to the channel raster of 100 kHz, the terminal apparatus 1 can detect an NB-IoT cell having ($f_{raster}-f_{NB-IoT}$) of 2.5 kHz. For example, by applying the channel raster offset of 2.5 kHz to the channel raster of 100 kHz, the terminal apparatus 1 can detect an NB-IoT cell corresponding to each physical resource block of the physical resource block index $n_{PRB} \in \{4, 9, 14, 19, 24, 29, 34, 39, 44\}$ in the LTE cell having a channel bandwidth of 20 MHz.

There are 20 different $(f_{raster}-f_{NB-IoT})$, i.e., $\{-47.5, -42.5, -37.5, -32.5, -27.5, -22.5, -17.5, -12.5, -7.5, -2.5, 2.5, 7.5, 12.5, 17.5, 22.5, 27.5, 32.5, 37.5, 42.5, 47.5\}$. By the terminal apparatus 1 applying each of all the 20 different values as a channel raster offset for the channel raster of 100 kHz, the terminal apparatus 1 can detect an NB-IoT cell corresponding to each physical resource block of any of the physical resource block indices $n_{PRB}$ in the LTE cell having any of channel bandwidths. Applying each of all the 20 different values as a channel raster offset for the channel raster of 100 kHz is equivalent with applying a channel raster offset of 2.5 kHz to the channel raster of 5 kHz.

However, by the terminal apparatus 1 applying each of all the 20 different values as a channel raster offset for the channel raster of 100 kHz, a problem of an increase in cell search time and power consumption of the terminal apparatus 1 arises.

To address such a problem, the terminal apparatus 1 may perform cell search, based on assist information for cell search. A channel raster for cell search may be given at least by the assist information of cell search.

The assist information for cell search may be reported to the terminal apparatus 1 via the base station apparatus 3. The assist information for cell search may be stored in advance (configured in advance) in a memory, or the terminal apparatus 1 may acquire the assist information for cell search from the memory. The memory may be a memory included in the terminal apparatus 1, an external memory, a Universal Subscriber Identity Module (USIM) card, or a USIM application.

The assist information for cell search may indicate part of or all the following. The assist information for cell search may include information indicating the following.

(1) Channel raster spacing (e.g., 5 kHz, 100 kHz)
(2) Channel raster offset value
(3) Scenario (standalone, in-band, guard band)
(4) Channel bandwidth $N^{DL}_{RB}$ of LTE cell including NB-IoT cell
(5) Physical resource block index $n_{PRB}$ of physical resource block corresponding to NB-IoT cell
(6) Value given by dividing carrier center frequency of NB-IoT cell included in LTE cell by carrier center frequency of LTE cell
(7) Value given by dividing carrier center frequency of LTE cell by the carrier center frequency of NB-IoT cell included in LTE cell
(8) Carrier center frequency of NB-IoT cell (6) above may be expressed by the channel raster spacing and the channel raster offset value. Here, the channel raster offset value is smaller than the channel raster spacing.

Part of or all the assist information for cell search may be predefined by a specification or the like.

FIG. 18 is a table illustrating an example of a relationship between each channel raster and a physical resource index (indices) of an LTE cell to which an NB-IoT cell that can be detected in the channel raster corresponds, in the present embodiment. For example, in a case that the channel raster spacing is 100 kHz and the channel raster offset value is −7.5 kHz, the terminal apparatus 1 can detect NB-IoT cells corresponding to physical resource block indices $\{2, 7\}$ of the LTE cell having a channel bandwidth of 5 MHz.

The carrier center frequency of the NB-IoT cell detected in the channel raster having spacing of 100 kHz and a channel raster offset value of −7.5 kHz is given according to Equation (6).

$$f_{NB-IoT}=100*n-180*5*m-7.5 \text{ (kHz)} \quad \text{(Equation 6)}$$

The carrier center frequency of the NB-IoT cell detected in the channel raster having spacing of 100 kHz and a channel raster offset value of 7.5 kHz is given according to Equation (7).

$$f_{NB-IoT}=100*n+180*5*m+7.5 \text{ (kHz)} \quad \text{(Equation 7)}$$

The carrier center frequency of the NB-IoT cell detected in the channel raster having spacing of 100 kHz and a channel raster offset value of −2.5 kHz is given according to Equation (8).

$$f_{NB-IoT}=100*n+180*5*m+97.5 \text{ (kHz)} \quad \text{(Equation 8)}$$

The carrier center frequency of the NB-IoT cell detected in the channel raster having spacing of 100 kHz and a channel raster offset value of 2.5 kHz is given according to Equation (9).

$$f_{NB-IoT}=100*n-180*5*m-97.5 \text{ (kHz)} \quad \text{(Equation 9)}$$

The base station apparatus 3 may transmit, to the terminal apparatus 1, information for requesting transmission of the assist information for cell search. The terminal apparatus 1 may transmit, to the base station apparatus 3, the assist information for cell search, based on the reception of the request. The base station apparatus 3 may transmit, to the terminal apparatus 1, information for reconfiguration of the assist information for cell search, based on the received assist information for cell search. The terminal apparatus 1 may reconfigure the assist information for cell search, based on the information for reconfiguration of the assist information for cell search. Through these operations, the base station apparatus 3 can appropriately reconfigure the assist information for cell search.

The terminal apparatus 1 may identify a scenario (standalone, in-band, guard band), based on the carrier center frequency of the NB-IoT cell detected through cell search. For example, in a case that the carrier center frequency of the NB-IoT cell is a multiple of 100 kHz, the terminal apparatus 1 may determine that the scenario is standalone. For example, in a case that the carrier center frequency of the NB-IoT cell is not a multiple of 100 kHz, the terminal apparatus 1 may determine that the scenario is in-band.

The terminal apparatus 1 may identify a scenario (standalone, in-band, guard band), based on the channel raster used for detection of an NB-IoT cell. For example, in a case that the terminal apparatus 1 detects an NB-IoT cell in a first channel raster, the terminal apparatus 1 may determine that the scenario is standalone. Here, the first channel raster may be 100 kHz. For example, in a case that the terminal apparatus 1 detects an NB-IoT cell in a second channel raster, the terminal apparatus 1 may determine that the scenario is in-band. Here, the second channel raster may be $(100*n+\alpha)$ kHz. Here, n is an integer, and a is an offset value smaller than 100 and is one of $(f_{raster}-f_{NB-IoT})$ above.

NB-CRS will be described in detail below.

In the in-band scenario, NB-CRS is the same as CRS of the LTE cell.

Figure 19:
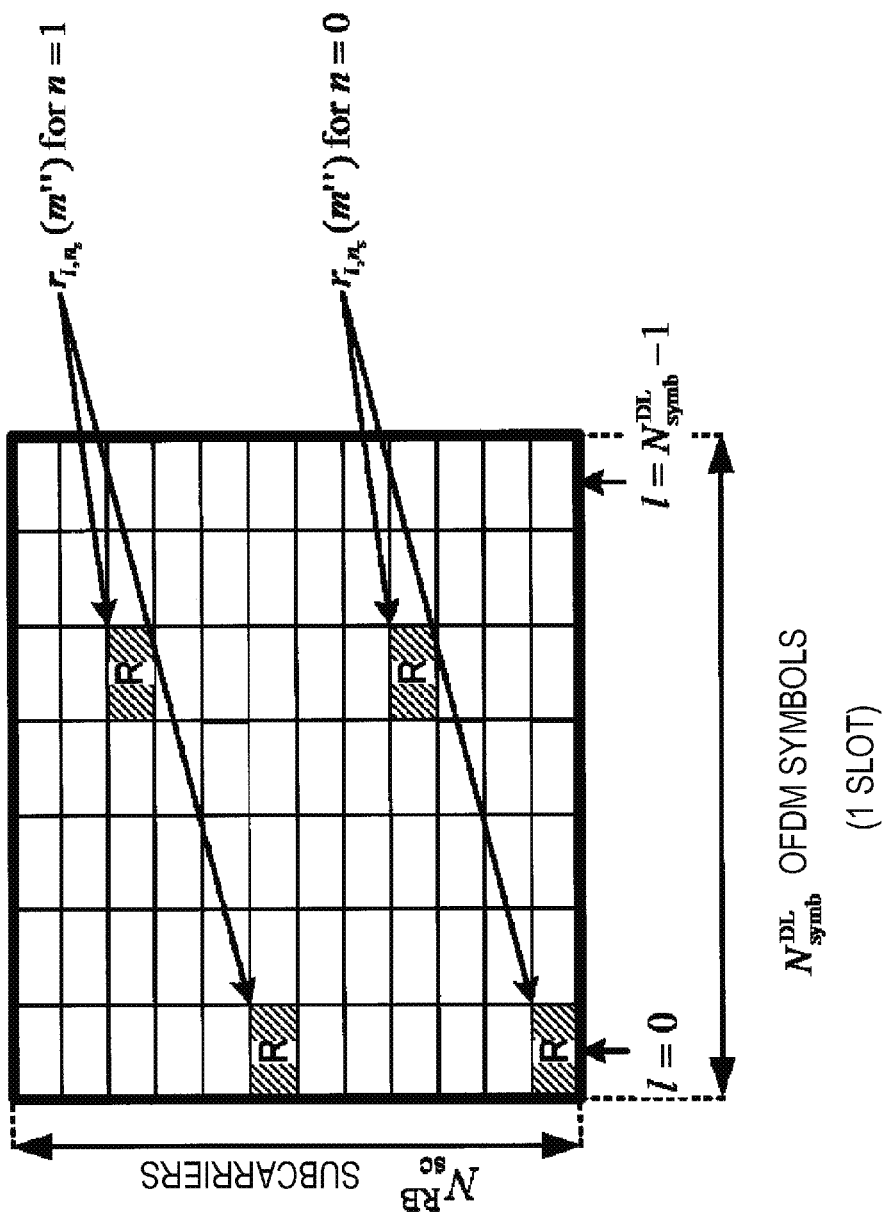
FIG. 19 is a diagram illustrating an example of CRS/NB-CRS mapped to one physical resource block in the present embodiment.

FIG. 19 is a diagram illustrating an example of CRS/NB-CRS mapped to one physical resource block in the present embodiment. CRS/NB-CRS is mapped to 0-th and $(N^{DL}_{symb}-3)$-th OFDM symbols. Two CRS are mapped to every one OFDM symbol.

A sequence of CRS/NB-CRS is given according to Equation (10).

$$r_{l,ns}(m)=1/\text{sqrt}(2)*(1-2*c(2m))+j*1/\text{sqrt}(2)*(1-2*c(2m+1)) \quad \text{(Equation 10)}$$

where
$m=0, 1, \ldots, 2*N^{max,DL}_{RB}-1$ j denotes an imaginary unit. l denotes an OFDM symbol index. $n_s$ denotes a slot number. sqrt(X) denotes a function returning a positive square root of X. $N^{max,DL}_{RB}$ denotes the maximum value of the transmission bandwidth of the LTE cell. c( ) denotes a pseudo-random sequence. Here, the pseudo-random sequence c may be initialized based on the slot number, the OFDM symbol index, and a Physical layer Cell Identity (PCI). Here, the PCI may be the PCI of the LTE cell or the PCI of the NB-IoT cell.

Figure 20:
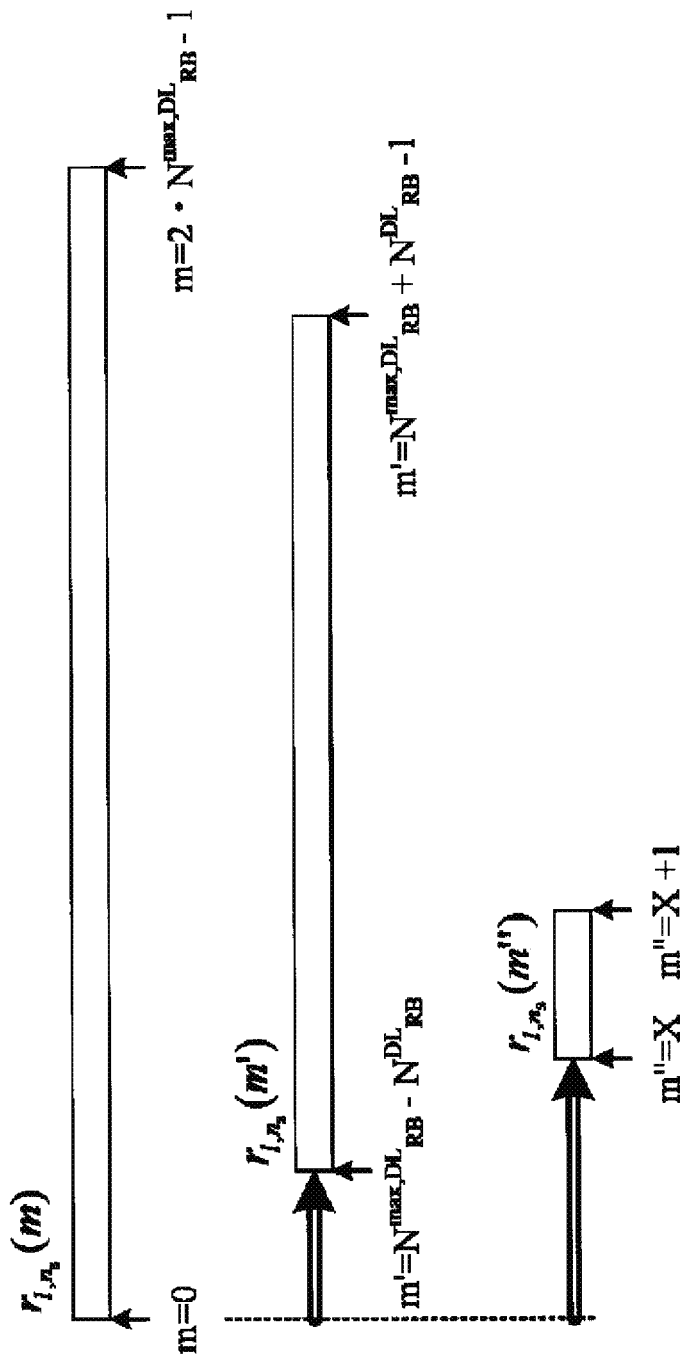
FIG. 20 is a diagram illustrating an example of a relationship between CRS and NB-CRS in the present embodiment.

The CRS sequence used in the LTE cell may be part of or all the sequences given according to Equation (10). The CRS sequence used in the NB-IoT cell may be part (two) of the sequences given according to Equation (10). FIG. 20 is a diagram illustrating an example of a relationship between CRS and NB-CRS in the present embodiment. The sequence mapped to the resource element $a_{k,l}$ of the LTE cell among the CRS sequence given according to Equation (10) is given according to Equation (11). k denotes a subcarrier number.

$$a_{k,l}=r_{l,ns}(m') \quad \text{(Equation 11)}$$

where
$k=6*n+(v+v_{shift}) \bmod 6$
$v_{shift}=N^{LTE,cell}_{ID} \bmod 6$
  v=0 if P=0
  l=0, $N^{DL}_{symb}-3$ if p=0
  $m'=n+N^{max,DL}_{RB}-N^{DL}_{RB}$
  $n=0, 1, \ldots, 2*N^{DL}_{RB}-1$ $N^{LTE\,cell}_{ID}$ denotes the PCI of the LTE cell. p denotes the index of a transmit antenna port through which CRS is transmitted. $N^{DL}_{RB}$ denotes the transmission bandwidth of the LTE cell. $N^{DL}_{symb}$ denotes the number of OFDM symbols included in one slot. X mod Y denotes a function returning the remainder left in a case that X is divided by Y.

In the in-band scenario, the sequence mapped to the resource element $a'_{k,l}$ of the NB-IoT cell among the CRS sequence given according to Equation (10) is given according to Equation (12).

$$a'_{k,l}=r_{l,ns}(m'') \quad \text{(Equation 12)}$$

where
$k=6*n+(v+v'\text{shift}) \bmod 6$
$v'_{shift}=N^{NB-IoT\,cell}_{ID} \bmod 6$
  v=0 if p=0
  l=0, $N^{DL}_{symb}-3$ if p=0
  $m''=n+\beta$
  n=0, 1

$N^{NB-IoT\,cell}_{ID}$ denotes the PCI of the NB-IoT cell. β is an offset value used in order for the terminal apparatus 1 to identify an NB-CRS sequence. The terminal apparatus 1 may identify β, based on the carrier center frequency of the NB-IoT cell, the channel raster used at the time of detecting the NB-IoT cell, and/or the information included in NB-PBCH. β may be given according to Equation (13). In other words, the terminal apparatus 1 may identify β, based on the physical resource block index $n_{PRB}$ of the LTE cell including the NB-IoT cell in the transmission band and the transmission bandwidth $N^{DL}_{RB}$ of the LTE cell including the NB-IoT cell in the transmission band. The information included in NB-PBCH may indicate the physical resource block index $n_{PRB}$ of the LTE cell including the NB-IoT cell in the transmission band and the transmission bandwidth $N^{DL}_{RB}$ of the LTE cell including the NB-IoT cell in the transmission band.

$$\beta=2*n_{PRB}+N^{max,DL}_{RB}-N^{DL}_{RB} \quad \text{(Equation 13)}$$

$v'_{shift}$ may be indicated by information included in NB-PBCH.

Figure 21:
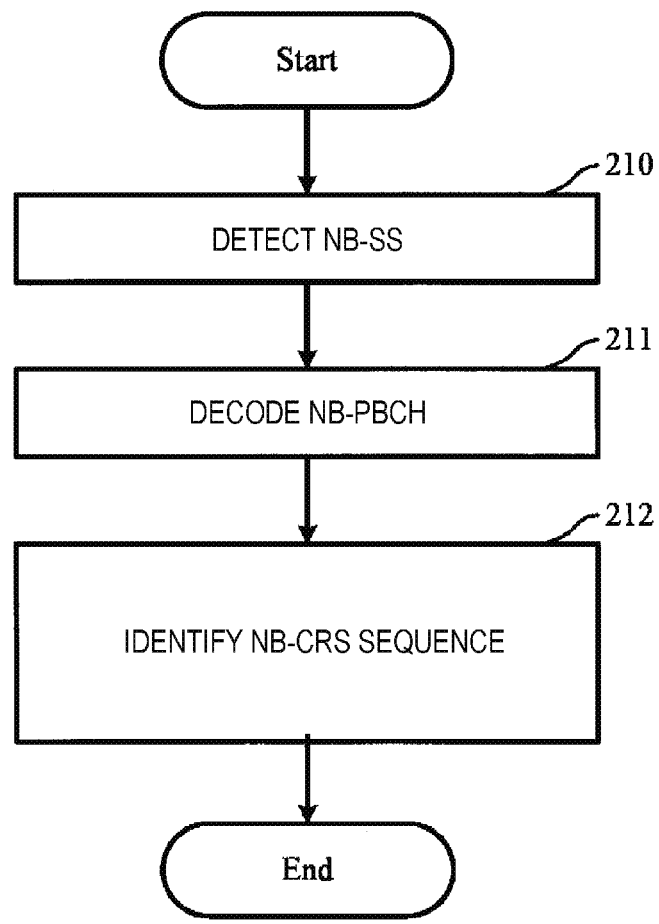
FIG. 21 is a diagram illustrating a flow for identifying an NB-CRS sequence in the present embodiment.

FIG. 21 is a diagram illustrating a flow for identifying an NB-CRS sequence according to the present embodiment. The terminal apparatus 1 detects NB-SS and acquires the PCI of the NB-IoT cell (Step 210). The terminal apparatus 1 decodes NB-PBCH and acquires the information included in NB-PBCH (Step 211). The terminal apparatus 1 identifies an NB-CRS sequence (Step 212). The terminal apparatus 1 may use NB-CRS for a reception process of a physical channel other than NB-PBCH and synchronization with the NB-IoT cell.

The terminal apparatus 1 performs a reception process of NB-PBCH by using NB-DL RS associated with transmission of NB-PBCH. NB-DL RS and NB-PBCH above may be mapped to OFDM symbols to which NB-CRS is not mapped. The sequence of NB-DL RS above may be given based on the PCI of the NB-IoT cell acquired in Step 210.

In a case that the PCI of the LTE cell and the PCI of the NB-IoT cell included in the transmission bandwidth of the LTE cell are the same, the terminal apparatus 1 may identify the pseudo-random sequence c associated with generation of NB-CRS, based on the PCI of the NB-IoT cell.

In a case that the PCI of the LTE cell and the PCI of the NB-IoT cell included in the transmission bandwidth of the LTE cell are different from each other, the terminal apparatus 1 may identify the pseudo-random sequence c associated with generation of NB-CRS, based on the information included in the NB-PBCH.

The information included in NB-PBCH may indicate part of or all the following. The assist information for cell search may include information indicating the following. Moreover, part of or all the following may be expressed by a mask to be applied to the CRC included in NB-PBCH. Moreover, part of or all the following may be defined for downlink and uplink separately.

(9) Channel raster spacing to which NB-IoT cell corresponds (e.g., 5 kHz, 100 kHz)

(10) Channel raster offset value to which NB-IoT cell corresponds

(11) Scenario (standalone, in-band, guard band)

(12) Channel bandwidth $N^{DL}_{RB}$ of LTE cell including NB-IoT cell

(13) Physical resource block index $n_{PRB}$ of physical resource block corresponding to NB-IoT cell

(14) Subcarrier number/index corresponding to NB-IoT cell

(15) Smallest physical resource block index $n_{PRB}$ of LTE cell to which transmission bandwidth of NB-IoT cell corresponds and/or a number of subcarriers (offset value) from a boundary of a resource block corresponding to the smallest physical resource block index $n_{PRB}$ to which transmission bandwidth of NB-IoT cell corresponds

(16) Smallest physical resource block index $n_{PRB}$ of LTE cell to which transmission bandwidth of NB-IoT cell corresponds

(17) Value given by dividing carrier center frequency of NB-IoT cell included in LTE cell by carrier center frequency of LTE cell

(18) Value given by dividing carrier center frequency of LTE cell by carrier center frequency of NB-IoT cell included in LTE cell

(19) Carrier center frequency of NB-IoT cell

(20) Carrier center frequency of LTE cell including NB-IoT cell in transmission band

(21) PCI of LTE cell including NB-IoT cell in transmission band

(22) Offset value β used in order for terminal apparatus 1 to identify NB-CRS sequence.

(23) $v'_{shift}$ used to identify resource elements to which NB-CRS is mapped

(24) Number of transmit antenna ports corresponding to NB-CRS

(21) above may be defined as parameter to be used for initialization of pseudo-random sequence c.

Structures of apparatuses according to the present embodiment will be described below.

Figure 22:
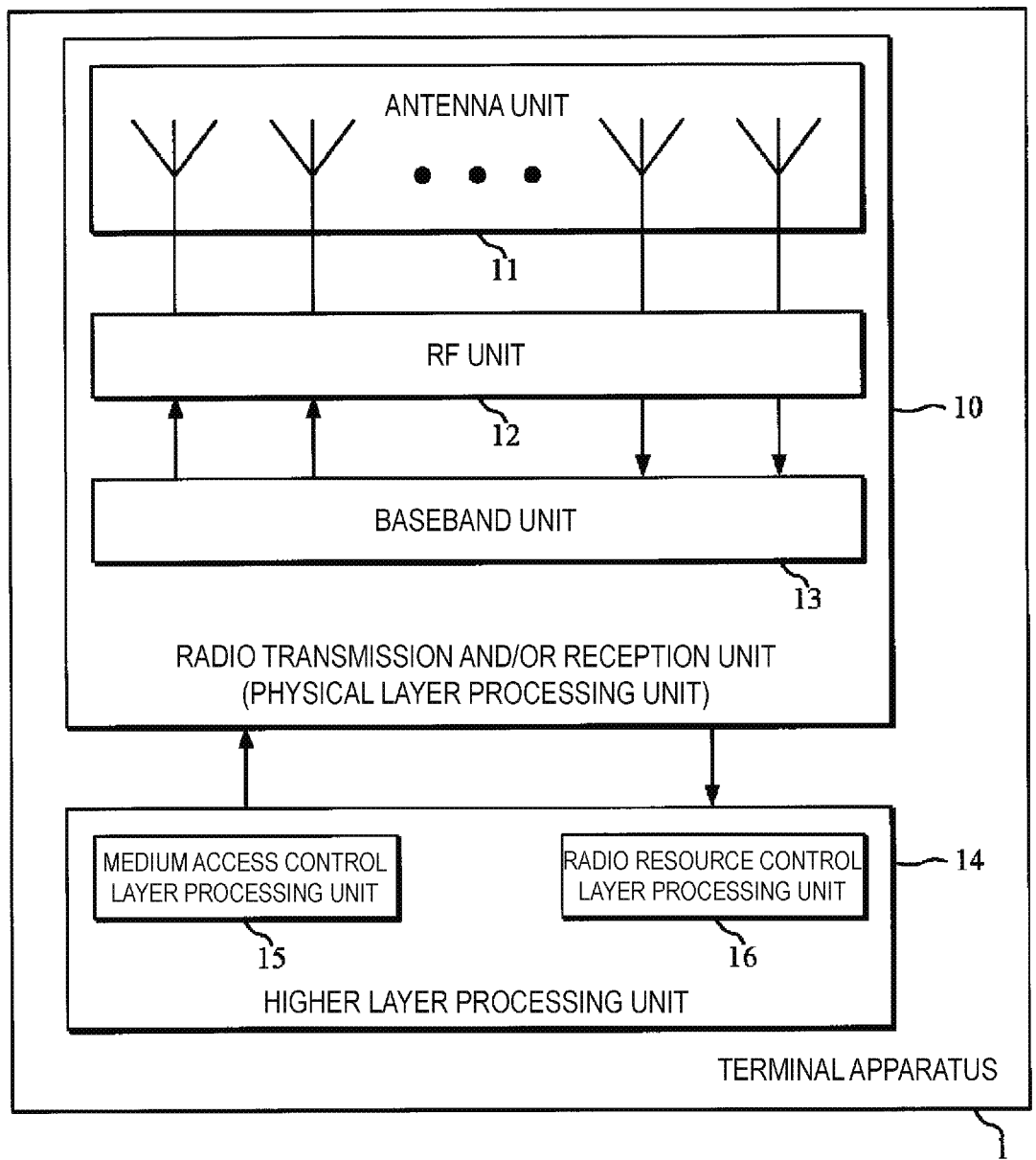
FIG. 22 is a schematic block diagram illustrating a configuration of a terminal apparatus 1 according to the present embodiment.

FIG. 22 is a schematic block diagram illustrating a configuration of the terminal apparatus 1 according to the present embodiment. As illustrated in FIG. 22, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmission unit, a reception unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of a medium access control layer. The medium access control layer processing unit 15 controls transmission of a scheduling request, based on various configuration information/parameters managed by the radio resource control layer processing unit 16.

The radio resource control layer processing unit 16 included in the higher layer processing unit 14 performs processing of a radio resource control layer. The radio resource control layer processing unit 16 manages the various configuration information/parameters of the terminal apparatus 1 itself. The radio resource control layer processing unit 16 sets the various configuration information/parameters in accordance with higher layer signaling received from the base station apparatus 3. Specifically, the radio resource control layer processing unit 16 sets the various configuration information/parameters in accordance with the information indicating the various configuration information/parameters received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 modulates and codes data to generate a transmit signal, and transmits the transmit signal to the base station apparatus 3.

The RF unit 12 converts (down-converts) a signal received through the antenna unit 11 into a baseband signal by orthogonal demodulation and removes unnecessary frequency components. The RF unit 12 outputs the processed analog signal to the baseband unit.

The baseband unit 13 converts the analog signal the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data, generates SC-FDMA symbols, attaches a CP to the generated SC-FDMA symbols, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. Furthermore, the RF unit 12 amplifies power. Furthermore, the RF unit 12 may have a function of controlling transmit power. The RF unit 12 is also referred to as a "transmit power control unit".

Figure 23:
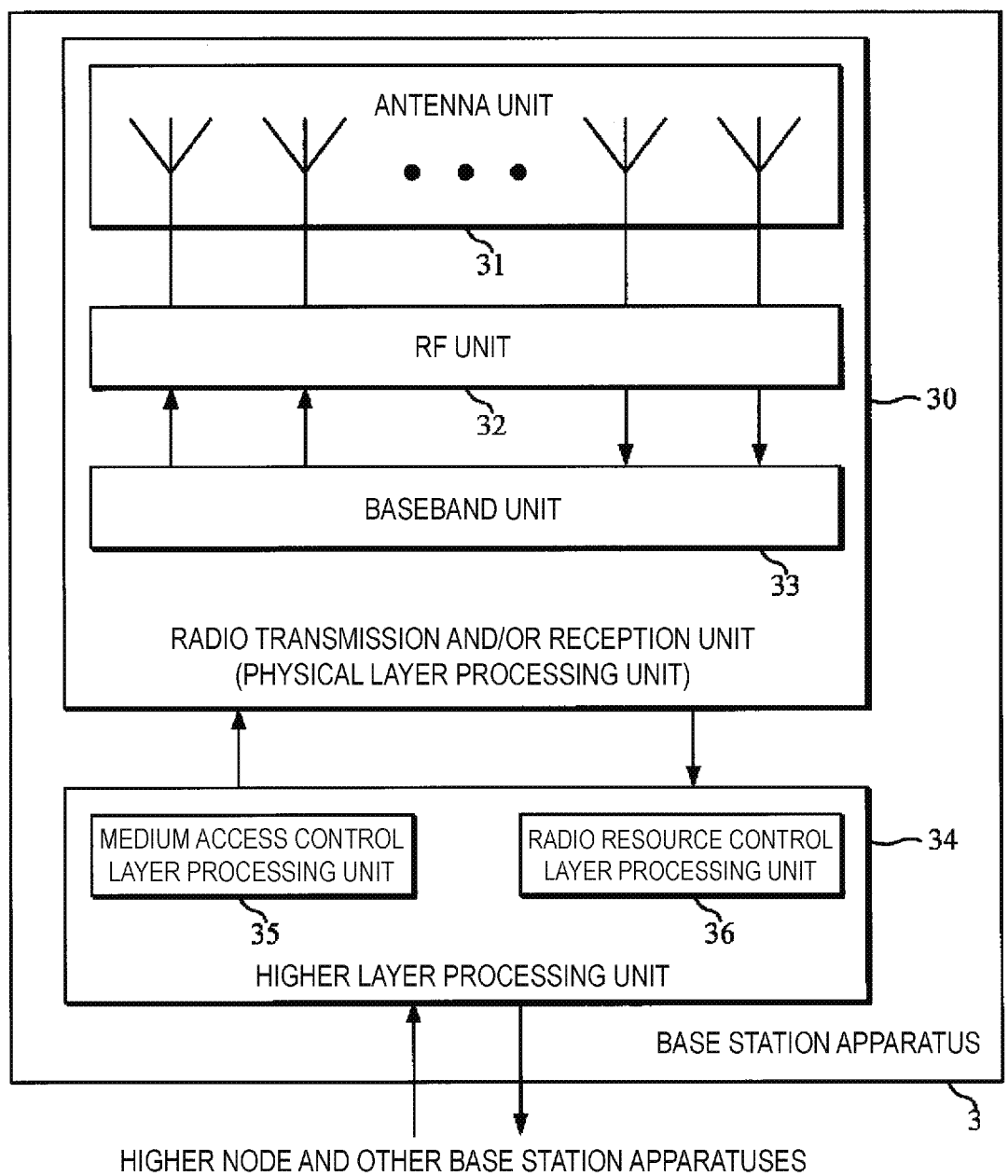
FIG. 23 is a schematic block diagram illustrating a configuration of a base station apparatus 3 according to the present embodiment.

FIG. 23 is a schematic block diagram illustrating a configuration of the base station apparatus 3 according to the present embodiment. As illustrated in FIG. 23, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmission unit, a reception unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 performs processing associated with a scheduling request, based on various configuration information/parameters managed by the radio resource control layer processing unit 36.

The radio resource control layer processing unit 36 included in the higher layer processing unit 34 performs processing of the radio resource control layer. The radio resource control layer processing unit 36 generates, or acquires from a higher node, downlink data (transport block) mapped to a physical downlink shared channel, system information, an RRC message, a MAC Control Element (CE), and the like, and outputs the generated or acquired data to the radio transmission and/or reception unit 30. Furthermore, the radio resource control layer processing unit 36 manages various configuration information/parameters for each of the terminal apparatuses 1. The radio resource control layer processing unit 36 may set various configuration information/parameters for each of the terminal apparatuses 1 via the higher layer signaling. In other words, the radio resource control layer processing unit 36 transmits/ broadcasts information indicating various configuration information/parameters.

The functionality of the radio transmission and/or reception unit 30 is similar to that of the radio transmission and/or reception unit 10, and hence description thereof is omitted.

Each of modules that are included in the terminal apparatus 1 and to which a reference sign 10 to a reference sign 16 are assigned may be configured as a circuit. Each of modules that are included in the base station apparatus 3 and to which a reference sign 30 to a reference sign 36 are assigned may be configured as a circuit.

Hereinafter, various aspects of the terminal apparatus 1 and the base station apparatus 3 in the present embodiment will be described.

(1) A first aspect of the present embodiment is the terminal apparatus 1 including a reception unit configured to acquire information on the frequency of an NB-IoT cell, acquire time and frequency synchronization with the NB-IoT cell, based on the information on the frequency of the NB-IoT cell, and perform cell search, which is a procedure for detecting a cell identity (PCI) of the NB-IoT cell. The information on the frequency of the NB-IoT cell indicates a first value and a second value. The frequency of the NB-IoT cell is indicated by the frequency indicated by the first value and the frequency offset indicated by the second value. "0" of the first value corresponds to a frequency A (MHz). An increment of the first value corresponds to an increment of a frequency B (kHz). The absolute value of the frequency offset indicated by the second value is smaller than B.

(2) In the first aspect of the present embodiment, the terminal apparatus 1 includes a memory in which the information on the frequency of the NB-IoT cell is preconfigured.

(3) In the first aspect of the present embodiment, the reception unit refers to a card or a Universal Subscriber Identity Module (USIM) to acquire the information on the frequency of the NB-IoT cell.

(4) In the first aspect of the present embodiment, the frequency B (kHz) is the same as a channel raster value of the LTE cell.

(5) In the first aspect of the present embodiment, the sum of the A, C, and the frequency offset corresponds to the center frequency of the physical resource block included in the transmission bandwidth of the LTE cell. The C is a value given by multiplying the B and a first positive integer. The center frequency of the physical resource block is different from the center frequency of the LTE cell.

(6) In the first aspect of the present embodiment, the B is 100 (kHz), and the frequency offset is +2.5 (kHz), −2.5 (kHz), +7.5 (kHz), −7.5 (kHz), +12.5 (kHz), −12.5 (kHz), +17.5 (kHz), −17.5 (kHz), +22.5 (kHz), −22.5 (kHz), +27.5 (kHz), −27.5 (kHz), +32.5 (kHz), −32.5 (kHz), +37.5 (kHz), −37.5 (kHz), +42.5 (kHz), −42.5 (kHz), +47.5 (kHz), or −47.5 (kHz).

(7) A second aspect of the present embodiment is the terminal apparatus 1 including a reception unit configured to acquire time and frequency synchronization with an NB-IoT cell, perform cell search, which is a procedure for detecting a cell identity (PCI) of the NB-IoT cell, and receive a broadcast channel including first information in the NB-IoT cell. The transmission band of the NB-IoT cell is included in the transmission band of an LTE cell. The physical resource block index of the LTE cell corresponding to the NB-IoT cell and/or the transmission bandwidth of the LTE cell is based at least on the first information and whether the center frequency of the NB-IoT cell is a first frequency or a second frequency. The first frequency is (100*n+x) or (100*n−x) kHz, and the second frequency is (100*n+y) or (100*n−y) kHz. The n is an integer.

(8) In the second aspect of the present embodiment, a first reference-signal (NB-DL RS) sequence associated with transmission of the broadcast channel is based at least on the cell identity of the NB-IoT cell.

(9) In the second aspect of the present embodiment, the broadcast channel includes second information indicating the cell identity of the LTE cell. A second reference-signal (CRS) sequence included in the NB-IoT cell is based at least on the cell identity of the LTE cell, the physical resource block index of the LTE cell, and/or the transmission bandwidth of the LTE cell.

(10) In the second aspect of the present embodiment, the second reference signal (CRS/NB-CRS) sequence included in the NB-IoT cell is based at least on the cell identity of the NB-IoT cell, the physical resource block index of the LTE cell, and/or the transmission bandwidth of the LTE cell.

(11) In the second aspect of the present embodiment, the broadcast channel includes third information indicating the number of antenna ports for the second reference signal (CRS/NB-CRS).

(12) In the second aspect of the present embodiment, in a case that the transmission band of the NB-IoT cell is not included in the transmission band of the LTE cell, the first information is reserved.

(13) A third aspect of the present embodiment is the terminal apparatus 1 including a reception unit configured to acquire time and frequency synchronization with an NB-IoT cell, perform cell search, which is a procedure for detecting a cell identity (PCI) of the NB-IoT cell, and receive a broadcast channel including first information in the NB-IoT cell. In a case that the center frequency of the NB-IoT cell is either a first frequency or a second frequency, the terminal apparatus assumes that the transmission bandwidth of the NB-IoT cell is included in the transmission bandwidth of the LTE cell. In a case that the center frequency of the NB-IoT cell is a third frequency, the terminal apparatus assumes that the transmission bandwidth of the NB-IoT cell is not included in the transmission bandwidth of the LTE cell. The first frequency is (100*n+x) or (100*n−x) kHz, the second frequency is (100*n+y) or (100*n−y) kHz, and the third frequency is (100*n) kHz. The n is an integer.

(14) In the third aspect of the present embodiment, in a case that the transmission band of the NB-IoT cell is included in the transmission band of the LTE cell, the physical resource block index of the LTE cell corresponding to the NB-IoT cell and/or the transmission bandwidth of the LTE cell is based at least on the first information and whether the center frequency of the NB-IoT cell is the first frequency or the second frequency.

(15) In the third aspect of the present embodiment, first reference-signal (DMRS) sequence associated with transmission of the broadcast channel is based at least on the cell identity of the NB-IoT cell.

(16) In the third aspect of the present embodiment, the broadcast channel includes second information indicating the cell identity of the LTE cell. A second reference-signal (CRS) sequence included in the NB-IoT cell is based at least on the cell identity of the LTE cell, the physical resource block index of the LTE cell, and/or the transmission bandwidth of the LTE cell.

(17) In the third aspect of the present embodiment, the second reference-signal (CRS) sequence included in the NB-IoT cell is based at least on the cell identity of the NB-IoT cell, the physical resource block index of the LTE cell, and/or the transmission bandwidth of the LTE cell.

(18) In the third aspect of the present embodiment, in a case that the transmission band of the NB-IoT cell is not included in the transmission band of the LTE cell, a sequence of a second reference signal (CRS) included in the NB-IoT cell is based at least on the cell identity of the NB-IoT.

According to the above, the terminal apparatus and the base station apparatus can efficiently communicate with each other by using downlink.

The base station apparatus 3 according to the present invention may alternatively be implemented as an aggregation (device group) including multiple devices. Devices constituting such a device group may be each equipped with some or all portions of each functionality or each functional block of the base station apparatus 3 according to the above-described embodiment. The device group may include at least general functionalities or general functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functionalities of a node higher than an eNodeB.

A program running on each of the apparatuses according to the present invention may be a program for controlling a Central Processing Unit (CPU) and the like to cause a computer to function in such a manner as to implement functions of the above-described embodiment according to the present invention. The program or the information handled by the program is temporarily read into a volatile memory, such as a Random Access Memory (RAM) during processing, or stored in a nonvolatile memory, such as a flash memory, or a Hard Disk Drive (HDD), and is read by the CPU to be modified or rewritten, as appropriate.

The apparatuses according to the above-described embodiment may be partially implemented by a computer. In such a case, a program for enabling such control functions may be provided by being recorded on a computer-readable recording medium to cause a computer system to read the program recorded on the recording medium for execution. Here, it is assumed that the "computer system" refers to a computer system built into each apparatus, and the computer system includes an operating system and hardware components such as a peripheral device. Moreover, the "computer-readable recording medium" may be any of a semiconductor recording medium, an optical recording medium, a magnetic recording medium, and the like.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the above-described program may be configured to enable some of the functions described above, and additionally may be configured to enable the functions described above, in combination with a program already recorded in the computer system.

Moreover, each functional block or feature of the apparatuses used in the above-described embodiment can be implemented or performed by an electric circuit, i.e., an integrated circuit or multiple implemented circuits in a typical sense. The electric circuits designed to perform the functions described herein may include a general-purpose processor, a digital signal processor (DSP), an application specific integrated circuit (ASIC), a field programmable gate array (FPGA), or other programmable logic devices, discrete gates or transistor logic, discrete hardware components, or constituent elements obtained by combining the above. Although the general-purpose processor may be a microprocessor, the processor may be a processor of known type, a controller, a micro-controller, or a state machine instead. The general-purpose processor or each of the above-mentioned circuits may be constituted by a digital circuit or may be constituted by an analog circuit. Furthermore, in a case that with advances in semiconductor technology, a circuit integration technology with which current integrated circuits are replaced appears, it is also possible to use integrated circuits based on the technology.

Note that the invention of the present patent application is not limited to the above-described embodiment. An example of apparatuses has been described in the embodiment. However, the invention of the present application is not limited to those, and is applicable to a terminal apparatus or a communication apparatus of a fixed-type or a stationary-type electronic apparatus installed indoors or outdoors, for example, such as an audio-video (AV) apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that is described in any of the above embodiments is substituted by another constituent element of such that achieves the same effect is also included in the technical scope of the present invention.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus comprising:
   a processor; and
   a memory associated with the processor; wherein
   the processor receives system information in a first band,
   the system information includes at least information indicating a number of subcarriers between a boundary of a resource block corresponding to a smallest physical resource block index $n_{PRB}$ to which transmission bandwidth of Narrow band-Internet of Things (NB-IoT) cell corresponds and the first band,
   the processor determines, based on the number of subcarriers, a first sequence allocated to resource elements included in a reference signal sequence, and
   the processor performs a reception process of a physical channel based on the first sequence.

2. A base station apparatus comprising:
   a processor; and
   a memory associated with the processor; wherein
   the processor sends system information in a first band,
   the system information includes at least information indicating a number of subcarriers between a boundary of a resource block corresponding to a smallest physical resource block index $n_{PRB}$ to which transmission bandwidth of Narrow band-Internet of Things (NB-IoT) cell corresponds and the first band,
   the processor determines, based on the number of subcarriers, a first sequence allocated to resource elements included in a reference signal sequence, and
   the processor performs a transmission process of a physical channel based on the first sequence.

3. A communication method of a terminal apparatus, the communication method comprising:
   receiving system information in a first band;
   determining, based on a number of subcarriers, a first sequence allocated to resource elements included in a reference signal sequence; and
   performing a reception process of a physical channel based on the first sequence, wherein
   the system information includes at least information indicating the number of subcarriers between a boundary of a resource block corresponding to a smallest physical resource block index $n_{PRB}$ to which transmission bandwidth of Narrow band-Internet of Things (NB-IoT) cell corresponds and the first band.

4. A communication method of a base station apparatus, the communication method comprising:
   sending system information in a first band;
   determining, based on a number of subcarriers, a first sequence allocated to resource elements included in a reference signal sequence; and
   performing a transmission process of a physical channel based on the first sequence, wherein
   the system information includes at least information indicating the number of subcarriers between a boundary of a resource block corresponding to a smallest physical resource block index $n_{PRB}$ to which transmission bandwidth of Narrow band-Internet of Things (NB-IoT) cell corresponds and the first band.

* * * * *